US010015842B2

(12) United States Patent
Bennett et al.

(10) Patent No.: US 10,015,842 B2
(45) Date of Patent: Jul. 3, 2018

(54) SLIDING WINDOW ASSEMBLY

(75) Inventors: Dan Bennett, Tecumseh, MI (US);
Mark S. Ackerman, Brooklyn, MI
(US); David W. Lahnala, Adrian, MI
(US)

(73) Assignee: AGC AUTOMOTIVE AMERICANS CO., Alpharetta, GA (US)

( * ) Notice: Subject to any disclaimer, the term of this patent is extended or adjusted under 35 U.S.C. 154(b) by 1312 days.

(21) Appl. No.: 12/944,444

(22) Filed: Nov. 11, 2010

(65) Prior Publication Data
US 2012/0091113 A1 Apr. 19, 2012

Related U.S. Application Data

(63) Continuation-in-part of application No. 12/906,444, filed on Oct. 18, 2010, now abandoned, which is a
(Continued)

(51) Int. Cl.
*B60L 1/02* (2006.01)
*H05B 1/00* (2006.01)
(Continued)

(52) U.S. Cl.
CPC .............. *H05B 3/84* (2013.01); *B60J 1/1853* (2013.01); *H05B 2203/014* (2013.01)

(58) Field of Classification Search
CPC ........ B60J 1/1853; B60J 1/002; B60J 1/1846; B60J 1/18; B60S 1/026; B60S 1/56;
(Continued)

(56) References Cited

U.S. PATENT DOCUMENTS 3,544,737 A 12/1970 Nowak
4,388,522 A 6/1983 Boaz
(Continued)

FOREIGN PATENT DOCUMENTS

DE 19930541 A1 1/2001
FR 2932736 A1 12/2009
WO 03024156 A2 3/2003

OTHER PUBLICATIONS

International Search Report for Application No. PCT/US2012/022973 dated Apr. 3, 2012, 3 pages.
(Continued)

*Primary Examiner* — Tu B Hoang
*Assistant Examiner* — Diallo I Duniver
(74) *Attorney, Agent, or Firm* — Howard & Howard Attorneys PLLC

(57) ABSTRACT

A cable drive system and a sliding window assembly for a vehicle are disclosed. The sliding window assembly includes a track adapted to be coupled to the vehicle. The sliding window assembly further includes a sliding panel coupled to the track and movable relative to the track between an open position and a closed position. A heating grid is coupled to the sliding panel for defrosting the sliding panel. The sliding window assembly also includes a cable coupled to the sliding panel for moving the sliding panel between the open and closed positions. In addition, the sliding window assembly includes a conductive element electrically connected to the heating grid and coupled with the cable such that the conductive element moves concurrently with the cable as the cable moves the sliding panel between the open and closed positions.

42 Claims, 15 Drawing Sheets

Related U.S. Application Data continuation-in-part of application No. 12/906,440, filed on Oct. 18, 2010, now abandoned.

(51) Int. Cl.
  *B60J 1/08* (2006.01)
  *H05B 3/84* (2006.01)
  *B60J 1/18* (2006.01)

(58) Field of Classification Search
  CPC .. H01R 35/02; H02G 11/02; H05B 2203/013; H05B 2203/014; H05B 3/84; H05B 2203/002; H05B 2203/009; H05B 2203/031; H05B 2203/005; H05B 2203/011; H05B 3/06; H01M 10/5016; H01M 10/504; H01M 10/5004; H01M 10/5051; H01M 10/5057; H01M 2/1016; H01M 2/202; H01M 2/34; Y02E 60/12; E05F 15/632; E05Y 2201/43; E05Y 2800/20
  USPC ............. 219/203, 201; 49/70, 349, 352, 506
  See application file for complete search history.

(56) References Cited

U.S. PATENT DOCUMENTS

| | | | |
|---|---|---|---|
| 4,920,698 A | 5/1990 | Friese et al. | |
| 5,542,214 A | 8/1996 | Buening | |
| 5,613,323 A | 3/1997 | Buening | |
| 5,716,536 A | 2/1998 | Yokoto et al. | |
| 5,724,771 A | 3/1998 | Gipson | |
| 6,014,840 A | 1/2000 | Ray et al. | |
| 6,071,453 A | 6/2000 | Church | |
| 6,204,480 B1 | 3/2001 | Woodward et al. | |
| 6,255,624 B1 | 7/2001 | Boaz et al. | |
| 6,382,697 B1 | 5/2002 | Mulder et al. | |
| 6,598,931 B2 | 7/2003 | Tamura | |
| 6,766,617 B2 * | 7/2004 | Purcell | 49/360 |
| 7,568,312 B2 | 8/2009 | Dufour et al. | |
| 2003/0110702 A1 | 6/2003 | Capriotti et al. | |
| 2003/0182866 A1 | 10/2003 | Nestell et al. | |
| 2004/0025439 A1 | 2/2004 | Purcell | |
| 2006/0059781 A1 | 3/2006 | Berklich, Jr. et al. | |
| 2006/0064934 A1 | 3/2006 | Vornbaumen et al. | |
| 2006/0107599 A1 | 5/2006 | Luten | |
| 2006/0174544 A1 | 8/2006 | Dufour et al. | |
| 2008/0268672 A1 | 10/2008 | Sargent et al. | |
| 2010/0122495 A1 | 5/2010 | Lahnala | |
| 2010/0122496 A1 * | 5/2010 | Lahnala | 49/360 |
| 2010/0146859 A1 * | 6/2010 | Gipson et al. | 49/348 |
| 2010/0154312 A1 | 6/2010 | Gipson et al. | |
| 2011/0030276 A1 * | 2/2011 | Smith et al. | 49/70 |
| 2011/0147153 A1 * | 6/2011 | Rutkowski et al. | 191/12.2 R |
| 2011/0181071 A1 | 7/2011 | Schaff et al. | |

OTHER PUBLICATIONS

English language abstract for DE19930541 extracted from espacenet.com database on Feb. 23, 2012, 9 pages.
English language abstract for FR 2932736 extracted from espacenet.com database on Mar. 9, 2012, 14 pages.
International Search Report for Application No. PCT/US2011/060455 dated Feb. 10, 2012, 4 pages.
International Search Report for Application No. PCT/US2011/060446 dated Feb. 17, 2012, 4 pages.
U.S. Appl. No. 12/944,448; Inventors Mark S. Ackerman, Dan Bennett and David W. Lahnala; filed Nov. 11, 2010; 63 pages.
"Low Closure Form, Foam Core EMI Gaskets" for Soft-Shield 4000 Series extracted from the website: http://www.chometrics.com; 3 pages.
"Technical Data Sheet" for Press-On P9100/P9200 Tape extracted from the website: http://www.pres-on.com/shared/pdf/P9100_9200.pdf; 2 pages.

* cited by examiner

SLIDING WINDOW ASSEMBLY

CROSS REFERENCE TO RELATED APPLICATIONS

This application is a continuation-in-part of co-pending U.S. non-provisional patent application Ser. No. 12/906,440 filed on Oct. 18, 2010 and co-pending U.S. non-provisional patent application Ser. No. 12/906,444 filed on Oct. 18, 2010, the disclosures of which are hereby incorporated by reference in their entirety.

BACKGROUND OF THE INVENTION

1. Field of the Invention

The subject invention generally relates to a cable drive system and a sliding window assembly for a vehicle.

2. Description of the Related Art

Window assemblies for vehicles are known in the art. One type of window assembly includes a first panel and a second panel each fixed to the vehicle. The first and second panels are spaced from each other to define an opening therebetween. A sliding panel is disposed between the first and second panels and is movable relative to the first and second panels between an open position and a closed position to selectively cover the opening. A first, second, and third heating grid can be coupled to the first, second, and sliding panels, respectively for defrosting or defogging the respective panels. As such, electrical wiring or electrical components are necessary to energize the heating grids. For example, contact switches have been utilized between the sliding panel and the first and second panels, but present durability concerns. As another example, contact connectors have been utilized on the sliding panel, but present noise concerns.

The sliding panel can be opened and closed either manually or automatically. When the sliding panel moves automatically, typically, a motor is utilized to move the sliding panel between the open and closed positions. More specifically, a first cable and a second cable are each coupled to the motor and the sliding panel for moving the sliding panel between the open and closed positions in response to the motor. However, the motor and the first and second cables are separate or independent from the electrical wiring to energize the heating grids of the panels and in particular, separate and independent from the third heating grid of the sliding panel. As such, vehicles have to be designed to accommodate both the motor and the cables to automatically open and close the sliding panel, as well as separate electrical wiring to defrost, in particular, the sliding panel, which is challenging due to limited packaging space within vehicles.

Therefore, there remains an opportunity to develop a sliding window assembly and a cable drive system.

SUMMARY OF THE INVENTION AND ADVANTAGES

The subject invention provides for a sliding window assembly for a vehicle including a track adapted to be coupled to the vehicle. The sliding window assembly further includes a sliding panel coupled to the track and movable relative to the track between an open position and a closed position. A heating grid is coupled to the sliding panel for defrosting the sliding panel. The sliding window assembly also includes a cable coupled to the sliding panel for moving the sliding panel between the open and closed positions. In addition, the sliding window assembly includes a conductive element electrically connected to the heating grid and coupled with the cable such that the conductive element moves concurrently with the cable as the cable moves the sliding panel between the open and closed positions.

The subject invention also provides for a cable drive system for the sliding panel having the heating grid. The system includes a motor and the cable coupled to the motor and adapted to be connected to the sliding panel with the cable movable between a first position and a second position. The system further includes the conductive element coupled with the cable for electrically connecting to the heating grid of the sliding panel with the conductive element movable concurrently with the cable between the first and second positions.

Therefore, the sliding window assembly and the cable drive system of the subject invention enable the conductive element to be coupled with the cable; thus providing space savings. More specifically, the conductive element is coupled with the cable for reducing the packaging space of the sliding window assembly and the cable drive system within the vehicle. In other words, coupling the conductive element with the cable eliminates the need to have separate independent devices to both open and close the sliding panel and defrost the sliding panel. Further, the conductive element coupled to the cable allows the heating grid of the sliding panel to defrost the sliding panel in both the open and closed positions. Said differently, the conductive element is electrically connected to the heating grid of the sliding panel in both the open and closed positions. In addition, by utilizing the conductive element coupled to the cable, contact switches and/or contact connectors, as discussed in the background of the invention section, can be eliminated.

BRIEF DESCRIPTION OF THE DRAWINGS

Advantages of the subject invention will be readily appreciated, as the same becomes better understood by reference to the following detailed description, when considered in connection with the accompanying drawings.

DETAILED DESCRIPTION OF THE INVENTION

Figure 1:
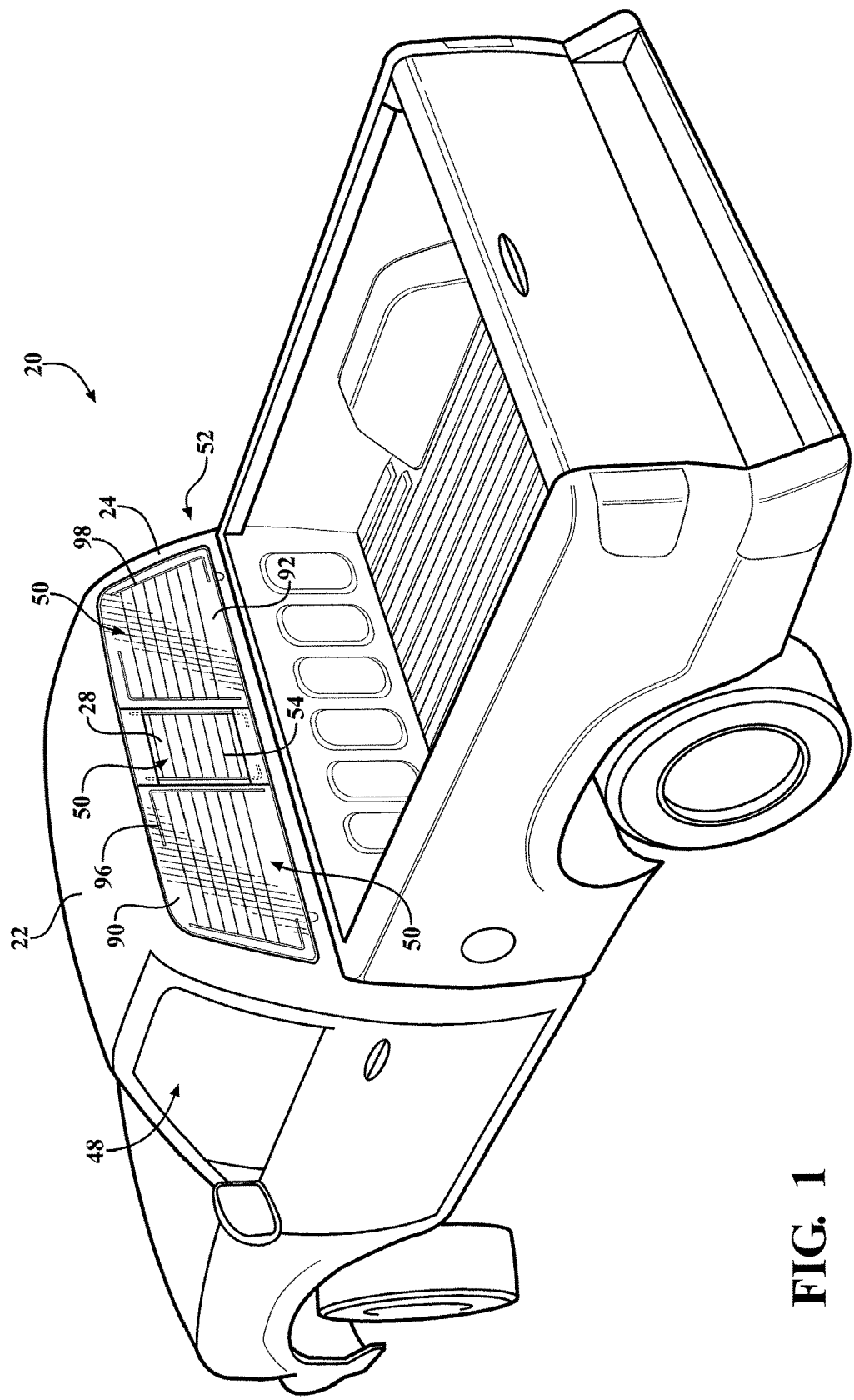
FIG. 1 is a perspective view of a sliding window assembly installed on a vehicle with a sliding panel in a closed position.

Referring to the Figures, wherein like numerals indicate like or corresponding parts throughout the several views, a sliding window assembly 20 for a vehicle 22 is generally shown. Typically, as shown in FIG. 1, the sliding window assembly 20 is coupled to a rear window body 24 of a pickup truck 22. However, it is to be appreciated that the sliding window assembly 20 can be coupled to any suitable location of other types of vehicles or non-vehicles.

Figure 2:
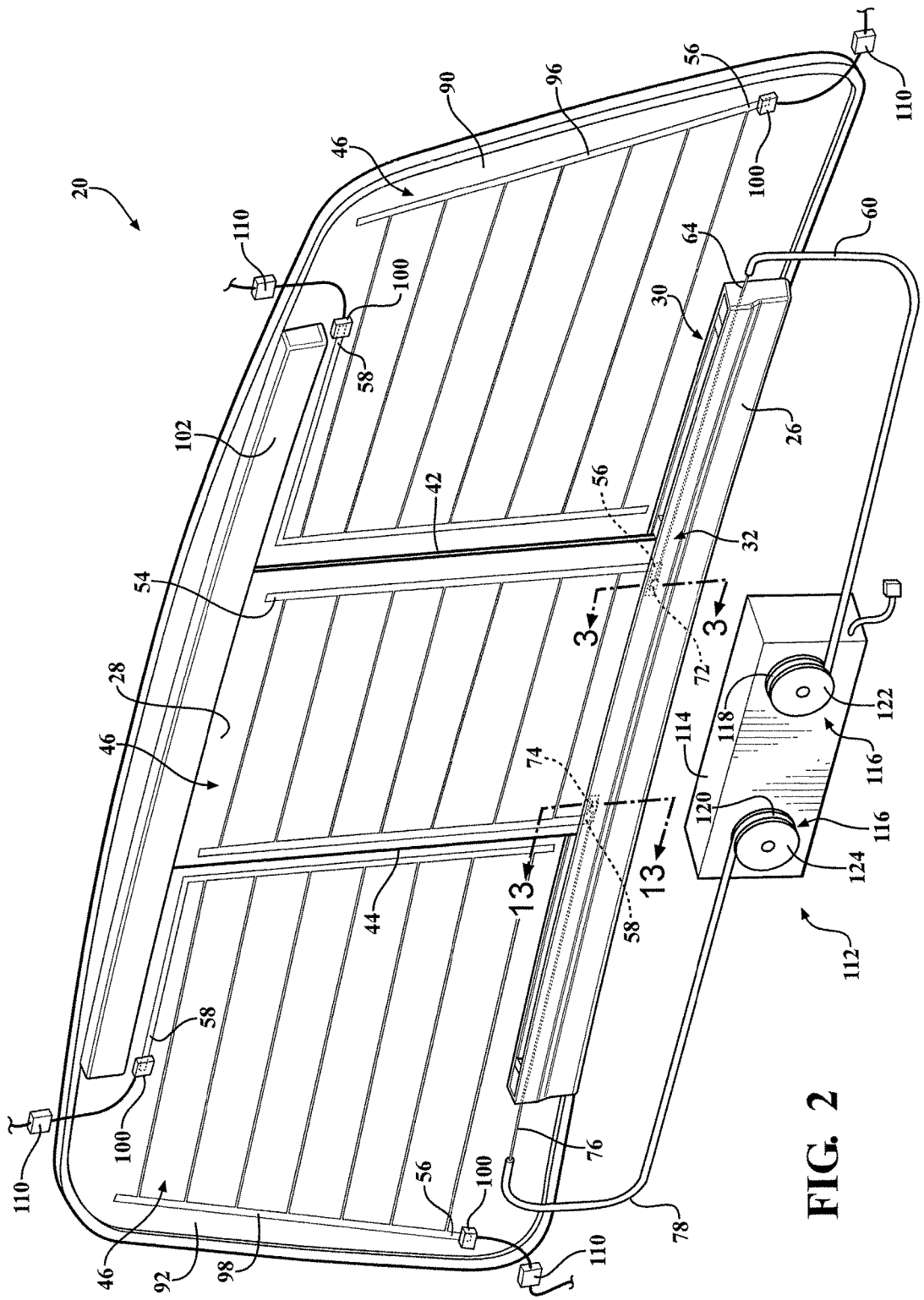
FIG. 2 is a perspective view of an interior of the sliding window assembly having a first fixed panel, a second fixed panel, and the sliding panel disposed therebetween in the closed position with a cable drive system including a motor having a first spool and a second spool.
Figure 3:
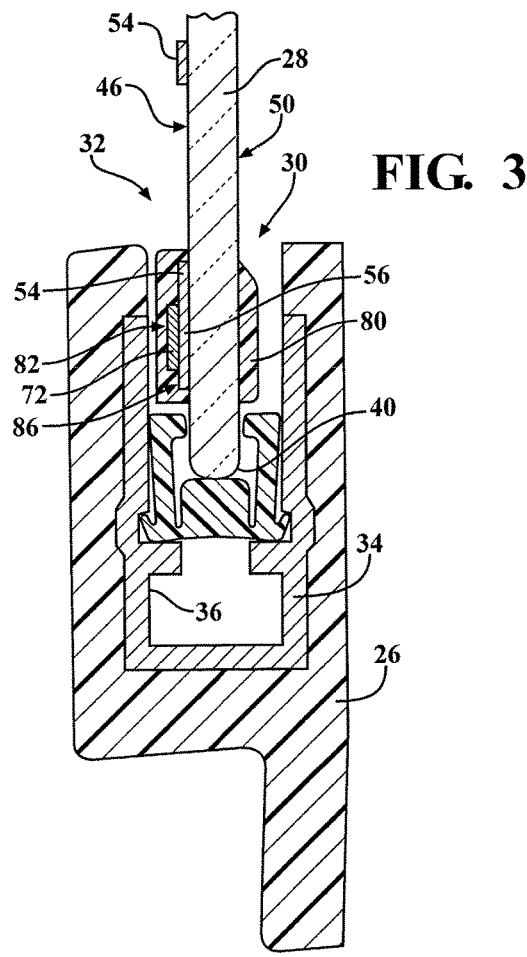
FIG. 3 is a cross-sectional view of the sliding panel, a track, and a rail disposed in the track taken along line 3-3 of FIG. 2.

As best shown in FIGS. 2 and 3, the sliding window assembly 20 includes a track 26 adapted to be coupled to the vehicle 22 and a sliding panel 28 movably coupled to the track 26. More specifically, the track 26 defines a slot 30 for receiving and/or guiding the sliding panel 28. The sliding panel 28 includes a bottom portion 32 at least partially disposed in the track 26. The sliding panel 28 is movable relative to the track 26 between an open position as shown in FIG. 4 and a closed position as shown in FIGS. 1, 2, 14A, 14B, 16-18, 22, and 23.

Referring back to FIG. 3, optionally, a rail 34 is disposed in the slot 30 of the track 26 with the sliding panel 28 movably coupled to the rail 34. More specifically, the rail 34 defines a channel 36 for receiving and/or guiding the sliding panel 28. Typically, the bottom portion 32 of the sliding panel 28 is at least partially disposed in the channel 36 of the rail 34. The rail 34 can define a generally u-shaped configuration or any other suitable configuration or orientation. The rail 34 is typically formed of a metal material. More typically, the metal material is an alloy. Suitable alloys include aluminum and/or iron alloys. It is to be appreciated that the rail 34 can be formed of polymeric material(s), such as plastic material(s), and/or any other suitable material(s). It is to further be appreciated that the rail 34, when formed of the metal material, such as the alloy, can be conductive (as discussed further below). It is also to be appreciated that the rail 34, when formed of the polymeric material, can be non-conductive. Further, if desired, strips of conductive material can be coupled to the rail 34 when formed of the non-conductive material for allowing the rail 34 to be conductive.

Figure 4:
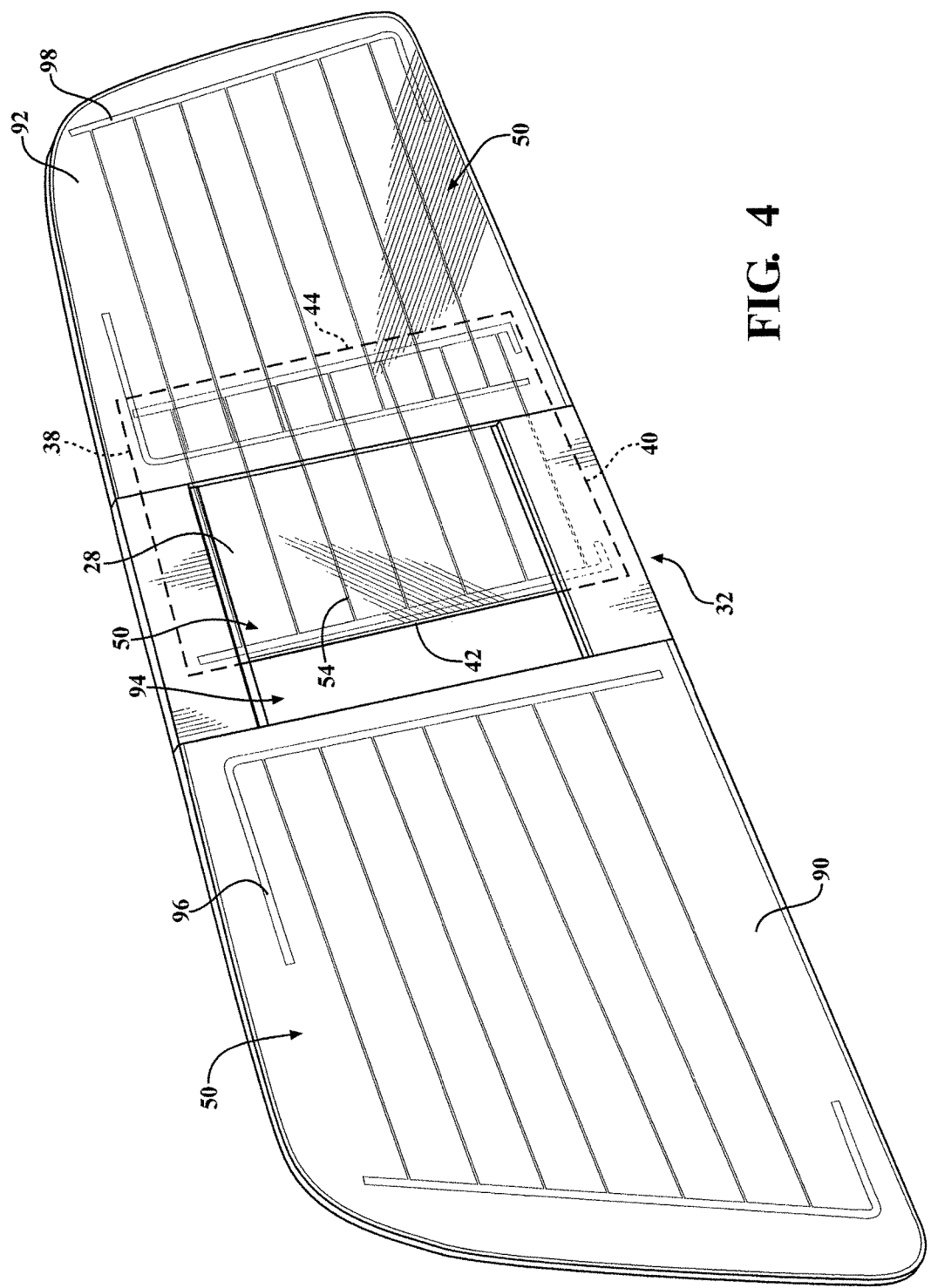
FIG. 4 is a perspective view of an exterior of the sliding window assembly having the sliding panel in an open position.

Turning to FIG. 4, the sliding panel 28 further includes a top edge 38 and a bottom edge 40 spaced from each other such that the top edge 38 opposes the bottom edge 40 with the bottom edge 40 disposed in the track 26. In addition, the sliding panel 28 includes a left edge 42 and a right edge 44 spaced from each other such that the left and right edges 42, 44 oppose each other. More specifically, the left and right edges 42, 44 are adjacent the top and bottom edges 38, 40. The sliding panel 28 has an interior surface 46 facing an interior 48 of the vehicle 22 when the sliding window assembly 20 is coupled to the vehicle 22, as best shown in FIGS. 1-3. In addition, the sliding panel 28 has an exterior surface 50 opposing the interior surface 46 such that the exterior surface 50 faces an exterior 52 of the vehicle 22 when the sliding window assembly 20 is coupled to the vehicle 22 (see FIGS. 1, 3, and 4).

Referring to FIG. 2, a heating grid 54 is coupled to the sliding panel 28 for defrosting the sliding panel 28. More typically, the heating grid 54 is coupled to the interior surface 46 of the sliding panel 28. It is to be appreciated that the heating grid 54 can be coupled to the exterior surface 50 of the sliding panel 28 or any other suitable location. The heating grid 54 includes a first end 56 and a second end 58 spaced from each other which will be discussed further below. It is to be appreciated that the first and second ends 56, 58 of the sliding panel 28 can be in any suitable location.

Figure 10:
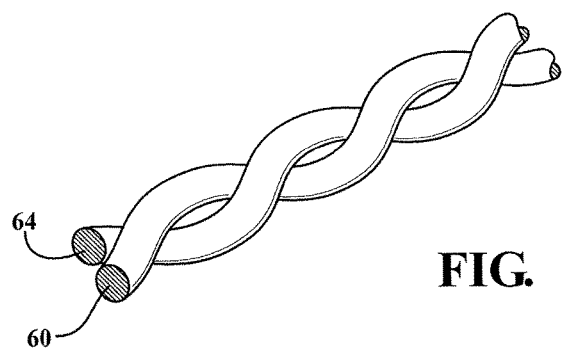
FIG. 10 is a broken cross-sectional perspective view of the cable and the conductive element intertwined together.

The sliding window assembly 20 further includes a cable 60 coupled to the sliding panel 28 for moving the sliding panel 28 between the open and closed positions. The cable 60 typically includes a plurality of strands 62 intertwined to define a braided cable as best shown in FIGS. 5-9. It is to be appreciated that the cable 60 can be any suitable configuration, such as a single strand 62 as shown in FIG. 10, a square configuration, etc., for moving the sliding panel 28 between the open and closed positions.

Referring to FIGS. 2 and 5-10, the sliding window assembly 20 also includes a conductive element 64 coupled with the cable 60 and electrically connected to the heating grid 54 of the sliding panel 28. The conductive element 64 moves concurrently with the cable 60 as the cable 60 moves the sliding panel 28 between the open and closed positions. As such, the heating grid 54 of the sliding panel 28 remains electrically connected to the conductive element 64 in both the open and closed positions.

Figure 5:
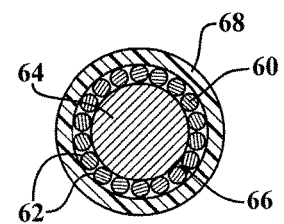
FIG. 5 is a cross-sectional view of a cable surrounding a conductive element with a first sheath surrounding both the cable and the conductive element.
Figure 6:
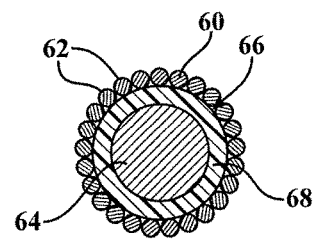
FIG. 6 is a cross-sectional view of the cable surrounding both the first sheath and the conductive element.
Figure 7:
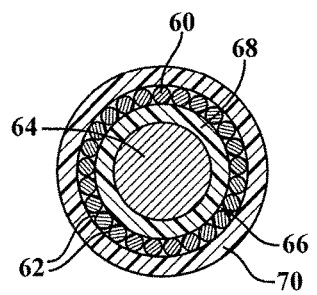
FIG. 7 is a cross-sectional view of a second sheath surrounding the cable, the first sheath, and the conductive element.
Figure 8:
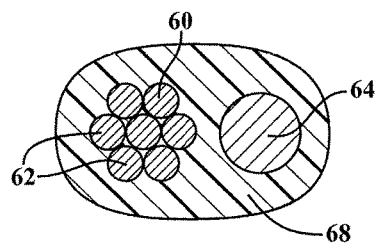
FIG. 8 is a cross-sectional view of the first sheath surrounding both the cable and the conductive element.
Figure 9:
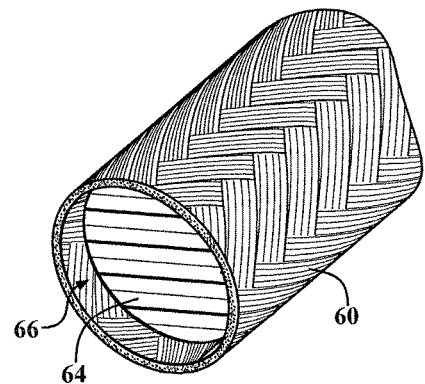
FIG. 9 is a broken cross-sectional perspective view of the cable surrounding the conductive element.

In certain embodiments, as shown in FIGS. 5-7 and 9, the conductive element 64 is disposed in the cable 60. In other words, the cable 60 defines a hollow 66 receiving the conductive element 64 with the cable 60 surrounding the conductive element 64. In one alternative, as shown in FIGS. 5 and 8, a first sheath 68 surrounds the cable 60. For example, as shown in FIG. 8, the cable 60 and the conductive element 64 are next to each other with the first sheath 68 surrounding both the cable 60 and the conductive element 64. As another example, as shown in FIG. 5, the cable 60 is disposed or sandwiched between the first sheath 68 and the conductive element 64. Hence, the first sheath 68 surrounds both the cable 60 and the conductive element 64. In another alternative, as shown in FIG. 6, the first sheath 68 surrounds the conductive element 64 instead of the cable 60. Therefore, the first sheath 68 is disposed or sandwiched between the cable 60 and the conductive element 64. In yet another alternative, as shown in FIG. 7, a second sheath 70 surrounds the cable 60, the first sheath 68, and the conductive element 64. For example, the cable 60 is disposed or sandwiched between the first and second sheaths 68, 70 with the first sheath 68 disposed or sandwiched between the cable 60 and the conductive element 64. It is to be appreciated that the conductive element 64 can be coupled with the cable 60 in any other suitable arrangement, such as, for example, intertwined together as shown in FIG. 10, etc. The first and/or second sheaths 68, 70 protect other components of the sliding window assembly 20 and/or the vehicle 22 from electrical current.

The first and/or second sheaths 68, 70 can be formed of polymeric material(s). The polymeric material(s) can be further defined as plastic material(s). It is to be appreciated that the first and/or second sheaths 68, 70 can be formed of thermoplastic, polyethylene, nylon, polyvinyl chloride (PVC), and/or any other suitable material(s).

Figure 11:
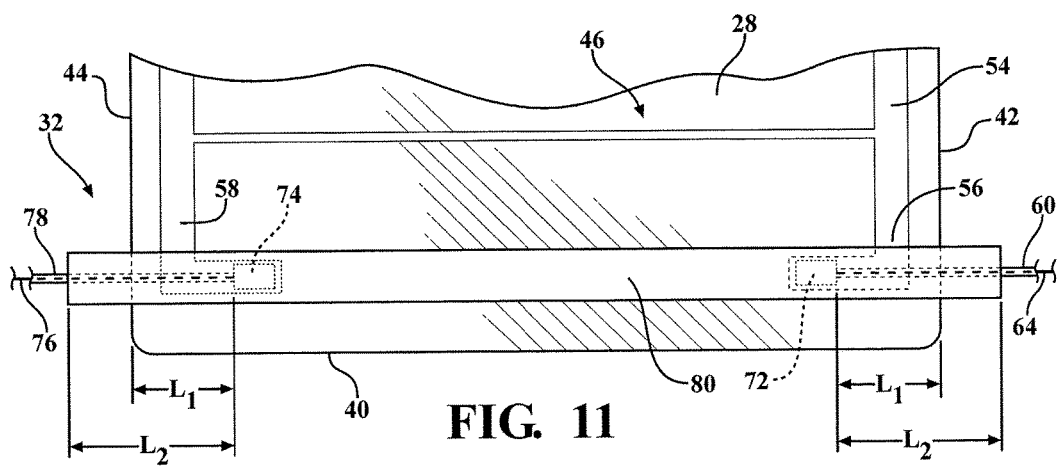
FIG. 11 is a broken plan view of the sliding panel with a bracket coupled to a bottom portion of the sliding panel with the cable and the conductive element coupled to the bracket.

As best shown in FIGS. 2 and 11, in one embodiment, the conductive element 64 includes a first terminal end 72 coupled to the first end 56 of the heating grid 54 and a second terminal end 74 coupled to the second end 58 of the heating grid 54 for electrically connecting the heating grid 54 of the sliding panel 28 to the conductive element 64. The first and second terminal ends 72, 74 of the conductive element 64 extend outwardly away from the cable 60 to enable the first and second terminal ends 72, 74 to be exposed to the first and second ends 56, 58 of the heating grid 54, respectively. It is to be appreciated that when utilizing the first and/or second sheaths 68, 70, the first and second terminal ends 72, 74 of the conductive element 64 also extends outwardly away from the first and/or second sheaths 68, 70 to enable the first and second terminal ends 72, 74 to be exposed to the first and second ends 56, 58 of the heating grid 54, respectively. The first and second terminal ends 72, 74 are coupled to the first and second ends 56, 58 of the heating grid 54 of the sliding panel 28, respectively by soldering. It is to be appreciated that the first and second terminal ends 72, 74 can be coupled to the first and second ends 56, 58 of the heating grid 54 of the sliding panel 28 respectively by the any other suitable method, such as, for example, welding, adhesive, etc.

In certain embodiments, the conductive element 64 is further defined as a first conductive element 64 and further including a second conductive element 76. In one alternative, the first conductive element 64 has the first terminal end 72 coupled to the first end 56 of the heating grid 54 and the second conductive element 76 has the second terminal end 74 coupled to the second end 58 of the heating grid 54. The first and second terminal ends 72, 74 electrically connect the heating grid 54 of the sliding panel 28 to each of the first and second conductive elements 64, 76. Typically, the conductive element 64 is further defined as a conductive core or wire, and more specifically, the first conductive element 64 is further defined as a first conductive core or wire and the second conductive element 76 is further defined as a second conductive core or wire. It is to be appreciated that the conductive wire, as well as the first and second conductive wires, can be any suitable configuration or orientation or location for electrically connecting to the heating grid 54 of the sliding panel 28. The conductive element 64, as well as the first and second conductive elements 64, 76, are typically formed of metal material(s), such as, for example copper and/or any other suitable conductive material(s).

In certain alternatives, the cable 60 is further defined as a first cable 60 coupled with the first conductive element 64 for moving the sliding panel 28 to the closed position and further including a second cable 78 coupled with the second conductive element 76 for moving the sliding panel 28 to the open position. In other words, the first cable 60 and the first conductive element 64 are coupled with each other and the second cable 78 and the second conductive element 76 are coupled with each other for moving the sliding panel 28. The first conductive element 64 moves concurrently with the first cable 60 and the second conductive element 76 moves concurrently with the second cable 78. Each of the first and second cables 60, 78 can define the hollow 66 with the hollow 66 of the first cable 60 receiving the first conductive element 64 such that the first cable 60 surrounds the first conductive element 64. Likewise, the hollow 66 of the second cable 78 receives the second conductive element 76 such that the second cable 78 surrounds the second conductive element 76.

The cable 60, as well as the first and second cables 60, 78, are typically formed of metal material(s), such as, for example, steel and/or any other suitable material(s). It is to be appreciated that the cable 60, as well as the first and second cables 60, 78, can be coated with zinc or any other suitable coating(s). For example, in one alternative, the cable 60, as well as the first and second cables 60, 78, are zinc coated and steel braided.

The first terminal end 72 of the first conductive element 64 extends outwardly away from the first cable 60 to enable the first terminal end 72 to be exposed to the first end 56 of the heating grid 54. Likewise, the second terminal end 74 of the second conductive element 76 extending outwardly away from the second cable 78 to enable the second terminal end 74 to be exposed to the second end 58 of the heating grid 54. It is to be appreciated that the first and/or second terminal ends 72, 74 of the first and/or second conductive elements 64, 76 can be coupled to the heating grid 54 of the sliding panel 28 at any suitable location.

In certain embodiments, the first sheath 68 can be further defined as a plurality of first sheaths 68 with one of the first sheaths 68 surrounding the first cable 60 and another one of the first sheaths 68 surrounding the second cable 78. In another alternative, one of the first sheaths 68 surrounds the first conductive element 64 such that the one of the first sheaths 68 is disposed between the first cable 60 and the first conductive element 64. Likewise, another one of the first sheaths 68 surrounds the second conductive element 76 such that the another one of the first sheaths 68 is disposed between the second cable 78 and the second conductive element 76. It is to be appreciated that even though only the plurality of first sheaths 68 has been detailed above, any of the various arrangements (see FIGS. 5-10) as discussed above for the cable 60, the conductive element 64, the first sheath 68, and the second sheath 70 can be utilized with the first and second cables 60, 78 and/or the first and second conductive elements 64, 76.

Figure 12:
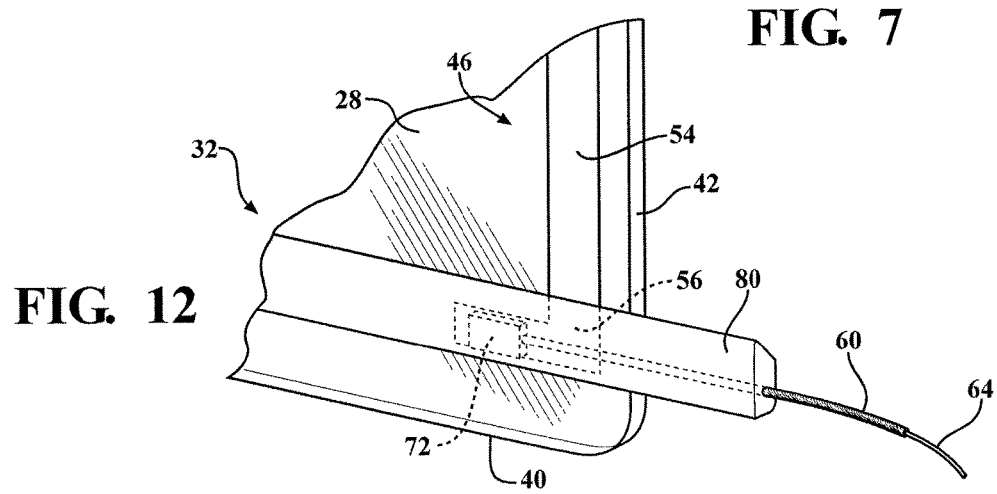
FIG. 12 is a broken perspective view of the sliding panel with the bracket coupled to the bottom portion of the sliding panel with the cable and the conductive element coupled to the bracket.

In another embodiment, as best shown in FIGS. 3, 11, and 12, the sliding window assembly 20 further includes a bracket 80 coupled to the sliding panel 28 with the cable 60 coupled to the bracket 80. More specifically, the bracket 80 is coupled to the bottom portion 32 of the sliding panel 28. In one alternative, the bracket 80 is coupled to the sliding panel 28 proximal to the bottom edge 40 of the sliding panel 28. It is to be appreciated that the bracket 80 can be coupled to the sliding panel 28 in any suitable location. Typically, the first and second cables 60, 78 are coupled to the bracket 80 to enable the first and second cables 60, 78 to move the bracket 80 which moves the sliding panel 28 between the open and closed positions. The bracket 80 transfers the force from the cable 60 to the sliding panel 28 for moving the sliding panel 28 within the track 26.

The bracket 80 is disposed in the channel 36 of the rail 34 such that the bracket 80 is hidden from a user's sight. The bracket 80 is substantially parallel to the bottom edge 40 of the sliding panel 28 and typically spans an entire length of the sliding panel 28. Said differently, the bracket 80 runs along the bottom portion 32 of the sliding panel 28 and extends past both the left and right edges 42, 44 of the sliding panel 28, as shown in FIG. 11.

The first and second cables 60, 78 and the first and second conductive elements 64, 76 each define a first common predetermined length $L_1$ overlapping the sliding panel 28 to electrically connect the first and second conductive elements 64, 76 to the heating grid 54, and more specifically, to electrically connect the first and second conductive elements 64, 76 to respective first and second ends 56, 58 of the heating grid 54 of the sliding panel 28. In addition, the first and second cables 60, 78 and the first and second conductive elements 64, 76 each define a second common predetermined length $L_2$ mounted to the bracket 80 such that the bracket 80 supports the first and second cables 60, 78 as the cables 60, 78 move the bracket 80 which moves the sliding panel 28 between the open and closed positions. Typically, the second common predetermined length $L_2$ is greater than the first common predetermined length $L_1$. It is to be appreciated that the first common predetermined length $L_1$ can be equal to the second common predetermined length $L_2$ or the first common predetermined length $L_1$ can be greater than the second common predetermined length $L_2$.

Figure 13:
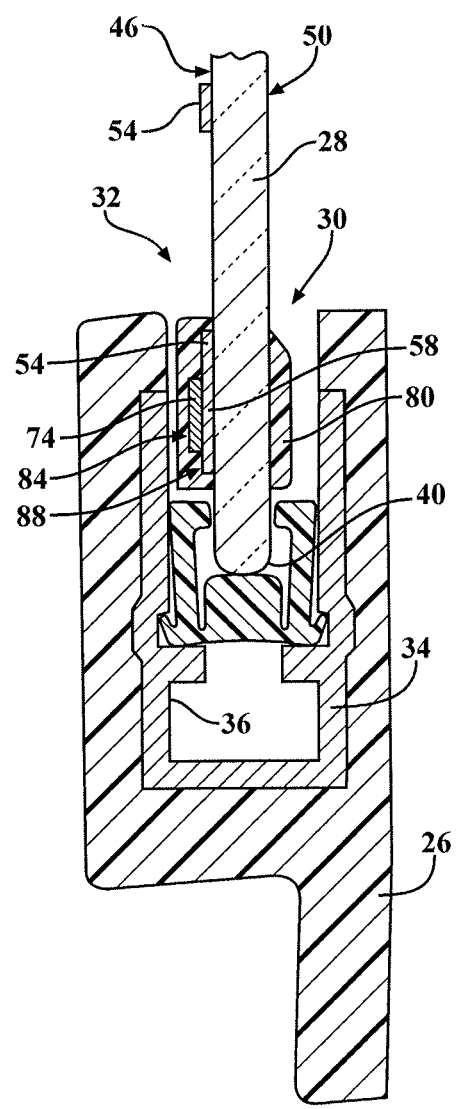
FIG. 13 is a cross-sectional view of the sliding panel, the track, and the rail disposed in the track taken along line 13-13 of FIG. 2.

Referring to FIG. 3, the bracket 80 defines a first pocket 82 receiving the first terminal end 72 of the first conductive element 64 for positioning the first terminal end 72 into engagement with the first end 56 of the heating grid 54. Referring to FIG. 13, the bracket 80 further defines a second pocket 84 receiving the second terminal end 74 of the second conductive element 76 for positioning the second terminal end 74 into engagement with the second end 58 of the heating grid 54. As shown in FIG. 3, the bracket 80 also defines a first groove 86 adjacent the first pocket 82 for receiving the first end 56 of the heating grid 54 and as shown in FIG. 13, the bracket 80 also defines a second groove 88 adjacent the second pocket 84 for receiving the second end 58 of the heating grid 54.

The bracket 80 is typically coupled to the sliding panel 28 by any suitable method, such as, for example, encapsulation, molding, bonding, etc. Generally, encapsulation results in an encapsulant that can be used to couple the bracket 80 to the sliding panel 28. In addition, encapsulation can be further defined as single-sided encapsulation, two-sided encapsulation, or three-sided encapsulation. For example, with single-sided encapsulation, the bracket 80 is coupled to the interior surface 46 of the sliding panel 28 leaving the exterior surface 50 of the sliding panel 28 free of the encapsulant. When encapsulation is employed, the bracket 80 is formed, at least partially, from the encapsulant. More specifically, with respect to encapsulation, the bracket 80 is formed of the encapsulant and is coupled to the sliding panel 28 by encapsulation. It is to be appreciated that any type of encapsulation or adhesive surface bonding can be utilized for coupling the bracket 80 to the sliding panel 28.

The bracket 80 is typically coupled to the interior surface 46 of the sliding panel 28. More typically, three-sided encapsulation is utilized which results in the bracket 80 being disposed on both the interior and exterior surfaces 46, 50 of the sliding panel 28 and both the left and right edges 42, 44 of the sliding panel 28. Three-sided encapsulation increases a surface area of the sliding panel 28 that the bracket 80 is coupled to while limiting a size of the bracket 80. Increasing the surface area in turn increases the bond strength between the bracket 80 and the sliding panel 28 while also limiting the size of the bracket 80 to provide an aesthetically pleasing appearance. It is to be appreciated that the bracket 80 can be coupled to only the interior surface 46 or only the exterior surface 50 of the sliding panel 28. Alternatively, the bracket 80 can be coupled to one of the interior and exterior surfaces 46, 50 of the sliding panel 28 and one of the left and right edges 42, 44 of the sliding panel 28. Furthermore, the bracket 80 can be coupled to both the interior and exterior surfaces 46, 50 and one of the left and right edges 42, 44.

When utilizing encapsulation for the bracket 80, the encapsulant is typically formed of plastic material(s) and more typically, thermoplastic material(s) and/or themoset material(s). Even more typically, the bracket 80 is formed of an isocyanate component and an isocyanate-reactive component. In certain embodiments, the bracket 80 is formed of polyurethane. One example of a suitable polyurethane is commercially available from BASF Corporation under the tradename of COLO-FAST™, e.g. COLO-FAST™ LM-161. It is to be appreciated that the encapsulant can be formed from various plastic material(s), such as, for example, nylon; acrylonitrile butadiene styrene (ABS); polybutylene terephthalate (PBT); polyvinyl chloride (PVC), thermoplastic elastomers (TPE); elastomeric alloys, e.g. thermoplastic vulcanizates (TPV); thermoplastic polyolefins (TPO); thermoplastic styrene (TPS); and various different types of reaction injection molding (RIM) materials; and/or any other suitable material(s) for encapsulation. It is to be appreciated that any other suitable material(s) can be utilized for forming the bracket 80. It is to also be appreciated that thermoplastics, such as nylon, ABS, or PBT can be utilized to form the bracket 80 as set forth above and can be bonded to the interior and/or exterior surfaces 46, 50 of the sliding panel 28. It is to be appreciated that a primer can be applied to the sliding panel 28 prior to molding the bracket 80 for increasing the bond strength between the bracket 80 and the sliding panel 28. Alternatively, the bracket 80 can be molded without the sliding panel 28 present and subsequently coupled to the sliding panel 28 by an adhesive.

In certain embodiments, as shown in FIGS. 1, 2, 4, 14A, 14B, 16-18, 22, and 23, the sliding window assembly 20 further includes a first fixed panel 90 adapted to be fixed to the vehicle 22 and a second fixed panel 92 adapted to be fixed to the vehicle 22. The second fixed panel 92 is spaced from the first fixed panel 90 to define an opening 94 therebetween. The sliding panel 28 covers the opening 94 when in the closed position as shown in FIGS. 1, 2, 14A, 14B, 16-18, 22, and 23 and the sliding panel 28 uncovers the opening 94 when in the open position as shown in FIG. 4. It is to be appreciated that the sliding panel 28 is in the open position when the sliding panel 28 is partially covering the opening 94. In other words, the sliding panel 28 is in the open position when the sliding panel 28 is completely or partially uncovering the opening 94. As such, the sliding panel 28 is in the closed position when the sliding panel 28 completely covers the opening 94.

Referring to FIGS. 1, 2, 4, 14A, 14B, 16-18, 22, and 23, the first and second fixed panels 90, 92 each have an interior surface 46 facing the interior 48 of the vehicle 22 when the sliding window assembly 20 is coupled to the vehicle 22. Further, the first and second fixed panels 90, 92 each have an exterior surface 50 opposing the interior surface 46 such that the exterior surface 50 faces the exterior 52 of the vehicle 22 when the sliding window assembly 20 is coupled to the vehicle 22. As such, the interior surface 46 of each of the panels 28, 90, 92 face the interior 48 of the vehicle 22 and the exterior surface 50 of each of the panels 28, 90, 92 face the exterior 52 of the vehicle 22.

The first and second fixed panels 90, 92 and the sliding panel 28 are each typically formed of glass. However, it is to be appreciated that the first and second fixed panels 90, 92, as well as the sliding panel 28, can each be formed from plastic material(s); metal material(s); glazing material(s), such as, for example, polymer glazing, laminated glass, tempered glass; and/or any other suitable material(s).

A left heating grid 96 is coupled to the first fixed panel 90 for defrosting the first fixed panel 90 and a right heating grid 98 is coupled to the second fixed panel 92 for defrosting the second fixed panel 92. It is to be appreciated that the heating grid 54 of the sliding panel 28 can be referred to as a center heating grid 54. The heating grid 54 of the sliding panel 28, as well as the left and right heating grids 96, 98, are typically formed of a paste for allowing electrical current to flow through the heating grids 54, 96, 98, which is discussed further below. The paste can be formed of silver, ceramic, and/or any other suitable material(s). The paste is typically bonded to the respective panels 28, 90, 92. It is to be appreciated that wires and/or conductive film can form the heating grids 54, 96, 98 instead of the paste for allowing electrical current to flow therethrough. Typically, wires are utilized with laminated glass; however, it is to be appreciated that wires can be utilized with material(s) other than laminated glass.

Referring to FIGS. 2, 14A, 14B, 16-18, 22, and 23, the left and right heating grids 96, 98 each include a first end 56 and a second end 58 spaced from each other. It is to be appreciated that the first and second ends 56, 58 of each of the left and right heating grids 96, 98 can be in any suitable location.

Figure 17:
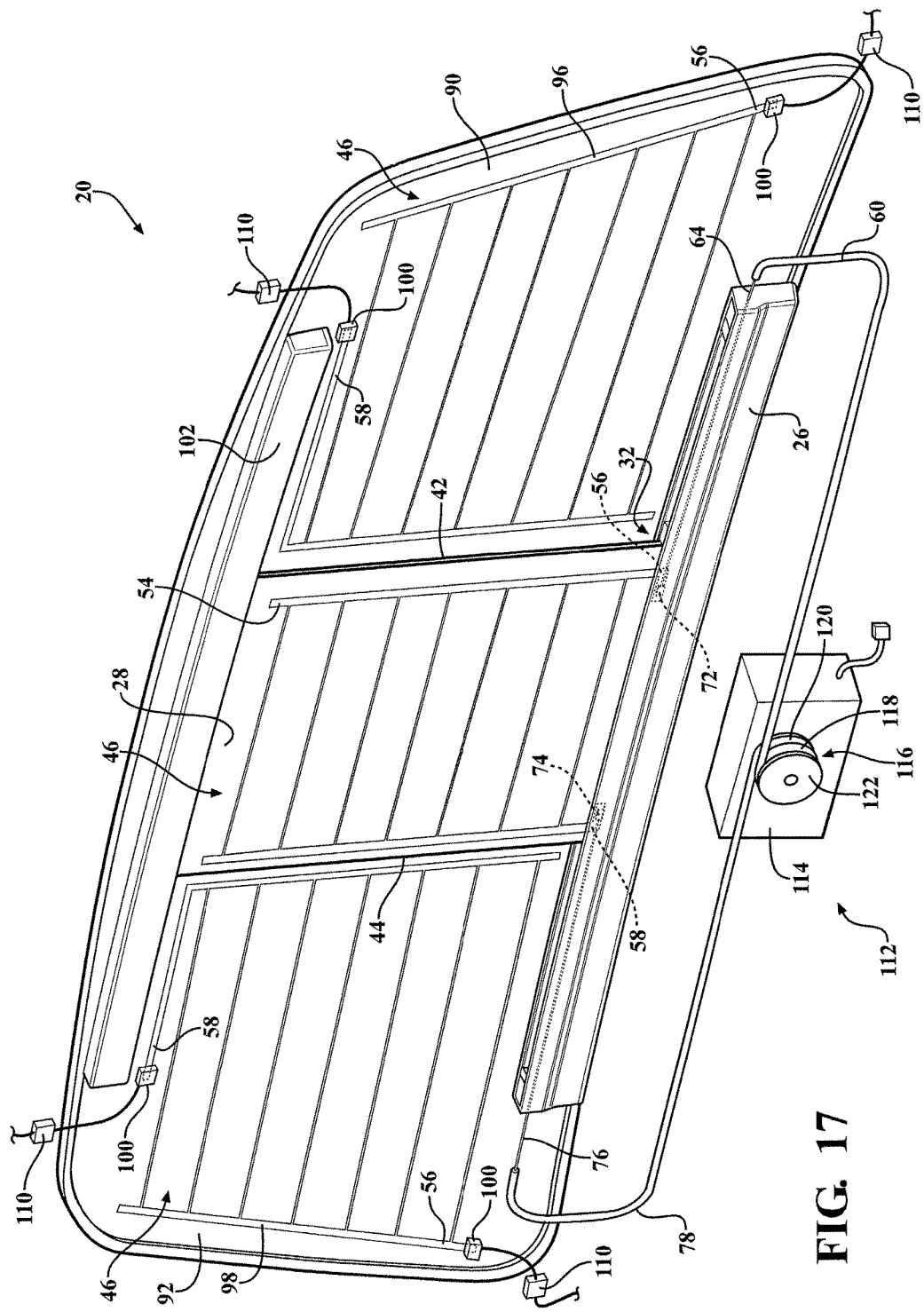
FIG. 17 is a perspective view of the interior of the sliding window assembly and another cable drive system including a motor having a first spool with a first cable and a second cable each coupled to the first spool.
Figure 18:
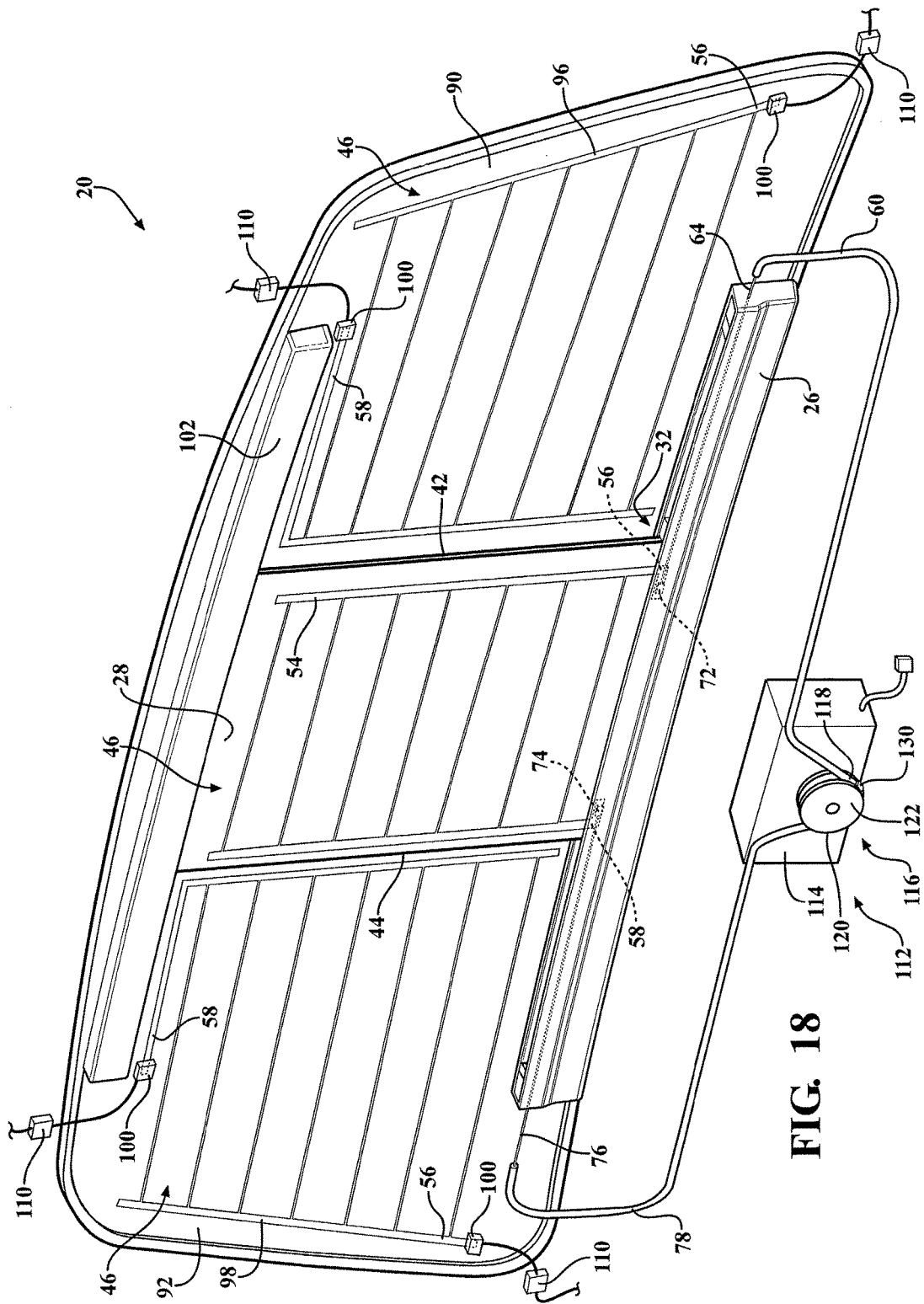
FIG. 18 is a perspective view of an interior of a sliding window assembly and yet another cable drive system including a motor having a first spool with a cable disposed about a portion of the first spool.

A plurality of connectors 100 are coupled to the left and right heating grids 96, 98 for allowing electrical current to flow therethrough. For example, FIGS. 2, 17, and 18 illustrate four connectors 100 with two connectors 100 coupled to the left heating grid 96 and two connectors 100 coupled to the right heating grid 98. More specifically, one of the connectors 100 is coupled to the first end 56 of the left heating grid 96 and another one of the connectors 100 is coupled to the second end 58 of the left heating grid 96. Likewise, yet another one of the connectors 100 is coupled to the first end 56 of the right heating grid 98 and yet another one of the connectors 100 is coupled to the second end 58 of the right heating grid 98. As another example, FIGS. 14A, 14B, 16, 22, and 23, illustrate only two connectors 100, which will be discussed further below. The connectors 100 are in electrical communication with a power supply of the vehicle 22 which is also as discussed further below. The connectors 100 are commonly referred to as pigtail connectors 100 as known to those skilled in the art. The connectors 100 can be coupled to the first and second ends 56, 58 of the left and right heating grids 96, 98 by soldering. It is to be appreciated that the connectors 100 can be coupled to the first and second ends 56, 58 of the left and right heating grids 96, 98 by welding, adhesive, and/or any other suitable method. It is to further be appreciated that the connectors 100 can be coupled to the left and/or right heating grids 96, 98 at any suitable location. In addition, it is to be appreciated that at least one of the connectors 100 can be coupled to the center heating grid 54.

Typically, the track 26 is coupled to the first and second fixed panels 90, 92 such that the sliding panel 28 moves relative to the first and second fixed panels 90, 92 between the open position uncovering the opening 94 and the closed position covering the opening 94. In certain embodiments, the track 26 is further defined as a first track 26 and further includes a second track 102 spaced from the first track 26 with the second track 102 also coupled to the first and second fixed panels 90, 92. Typically, the second track 102 is spaced above the first track 26 with the sliding panel 28 movably coupled to the first and second tracks 26, 102. In other words, the first and second tracks 26, 102 are disposed horizontally in a substantially spaced and parallel relationship such that the sliding panel 28 moves horizontally back and forth relative to the first and second fixed panels 90, 92. It is to be appreciated that the first and second tracks 26, 102 can be positioned in any other suitable orientation or location, such as, for example, vertically spaced such that the sliding panel 28 moves vertically up and down relative to the first and second fixed panels 90, 92. It is to further be appreciated that the rail 34 as discussed above can be further defined as a first rail 34 coupled to the first track 26 and further including a second rail 104 coupled to the second track 102 for receiving and/or guiding the sliding panel 28 (see FIGS. 14A, 14B, 16, 22, and 23). It is to be appreciated that the second track 102 can be configured generally the same as the first track 26 and the second rail 104 can be configured generally the same as the first rail 34. It is to be appreciated that various mechanical and electrical components can be re-orientated or relocated to accommodate vertical tracks 26, 102 and vertical rails 34, 104 for vertical movement of the sliding panel 28.

The first and second tracks 26, 102 are typically coupled to the first and second fixed panels 90, 92 by any suitable method, such as, for example, encapsulation, molding, bonding, etc. Generally, encapsulation results in an encapsulant that can be used to couple the first and second tracks 26, 102 to the first and second fixed panels 90, 92. As discussed above, encapsulation can be further defined as single-sided encapsulation, two-sided encapsulation, or three-sided encapsulation. For example, with single-sided encapsulation, the first and second tracks 26, 102 are coupled to the interior surface 46 of the first and second fixed panels 90, 92 leaving the exterior surface 50 of the first and second fixed panels 90, 92 free of the encapsulant. When encapsulation is employed, the first and second tracks 26, 102 are formed, at least partially, from the encapsulant. More specifically, with respect to encapsulation, the first and second tracks 26, 102 are formed of the encapsulant and are coupled to the first and second fixed panels 90, 92 by encapsulation. It is to be appreciated that any type of encapsulation or adhesive surface bonding can be utilized for coupling the first and second tracks 26, 102 to the first and second fixed panels 90, 92.

When utilizing encapsulation for the first and second tracks 26, 102, the encapsulant is typically formed of plastic material(s) and more typically, thermoplastic material(s) and/or themoset material(s). Even more typically, the plastic material is polyvinyl chloride (PVC). It is to be appreciated that the encapsulant can be formed from various plastic material(s), such as, for example, thermoplastic elastomers (TPE); elastomeric alloys, e.g. thermoplastic vulcanizates (TPV); thermoplastic polyolefins (TPO); thermoplastic styrene (TPS); polyurethane; and various different types of reaction injection molding (RIM) materials; and/or any other suitable material(s) for encapsulation. One example of a suitable polyurethane is commercially available from BASF Corporation under the tradename of COLO-FAST™, e.g. COLO-FAST™ LM-161. However, it is to be appreciated that any other suitable material(s) can be utilized for forming the first and second tracks 26, 102.

Referring to FIGS. 14A, 14B, 16, 22, and 23, in certain embodiments, the rail 34 as discussed above can be further defined as a conductive rail 34 in electrical connection to at least one of the left and right heating grids 96, 98, as further disclosed in U.S. patent application Ser. No. 12/944,448 filed concurrently with the subject application, the disclosure of which is incorporated by reference in its entirety. In other words, the conductive rail 34 is in electrical connection to the left heating grid 96 of the first fixed panel 90 or the right heating grid 98 of the second fixed panel 92. In one alternative, the conductive rail 34 is in electrical connection to both the left and right heating grids 96, 98 of the first and second fixed panels 90, 92, respectively. Hence, the left and/or right heating grids 96, 98 of the first and/or second fixed panels 90, 92, respectively are energized through the conductive rail 34 with the heating grid 54 of the sliding panel 28 energized through the conductive element 64. Additional discussion of the alternatives/embodiments of the conductive rail 34 and the conductive element 64 are below.

In one embodiment, the conductive rail 34 can be further defined as a first conductive rail 34 coupled to the first track 26 and further including a second conductive rail 104 coupled to the second track 102 such that the first and second conductive rails 34, 104 are in electrical connection to at least one of the left and right heating grids 96, 98. In one alternative, the first and second conductive rails 34, 104 are in electrical connection to both the left and right heating grids 96, 98 of the first and second fixed panels 90, 92, respectively. Hence, the left and/or right heating grids 96, 98 of the first and/or second fixed panels 90, 92, respectively are energized through the first and second conductive rails 34, 104. It is to be appreciated that any of the conductive rail 34, 104 embodiments/alternatives as disclosed in U.S. patent application Ser. No. 12/944,448 filed concurrently with the subject application, can be utilized with the cables 60, 78, the conductive elements 64, 76, etc., as disclosed herein. It is to be appreciated that the left heating grid 96 of the first fixed panel 90 can be energized by the conductive rail 34 while separately the right heating grid 98 of the second fixed panel 90 can be energized by another conductive rail 34. For example, the left heating grid 96 of the first fixed panel 90 can be energized by the first and second conductive rails 34, 104 while separately the right heating grid 98 of the second fixed panel 92 can be energized by another first and second conductive rails 34, 104.

Referring to FIGS. 14A, 14B, 15, and 16, a plurality of first lower connectors 105 are each coupled to the first conductive rail 34 and a plurality of first upper connectors 107 are each coupled to the second conductive rail 104 for electrically connecting the first and second conductive rails 34, 104 to the left and right heating grids 96, 98. Typically, the first lower connectors 105 are each coupled the first conductive rail 34 and respective left and right heating grids 96, 98. Similarly, the first upper connectors 107 are each coupled to the second conductive rail 104 and respective left and right heating grids 96, 98. More specifically, each of the first lower connectors 105 are coupled to the first conductive rail 70 and respective left and right heating grids 96, 98 with each of the first upper connectors 107 coupled to the second conductive rail 104 and respective left and right heating grids 96, 98. The first lower and upper connectors 105, 107 are coupled to respective first and second ends 56, 58 of the left and right heating grids 96, 98. It is to be appreciated that the first and second ends 56, 58 of the left and right heating grids 96, 98 can be at any suitable location. It is to further be appreciated that the first lower and upper connectors 105, 107 can be coupled to the left and right heating grids 96, 98, as well as the first and second conductive rails 34, 104, at any suitable location. The first lower and upper connectors 105, 107 can be coupled to the first and second conductive rails 34, 104 by soldering or by any other suitable method. See U.S. patent application Ser. No. 12/944,448 filed concurrently with the subject application for a further discussion of the first lower and upper connectors 105, 107 and the methods of coupling the first lower and upper connectors 105, 107 to the first and second conductive rails 34, 104.

Current, i.e., electrical current, flows through the left and/or right heating grids 96, 98 of the first and second fixed panels 90, 92 and the heating grid 54 of the sliding panel 28 by any suitable method. For all alternatives/embodiments described herein, the first and/or second conductive elements 64, 76 energize the heating grid 54 of the sliding panel 28. In one alternative, the first and/or second conductive elements 64, 76 energize the heating grid 54 of the sliding panel 28 and the first and/or second conductive rails 34, 104 energize one of the left and right heating grids 96, 98 of one of the first and second fixed panels 90, 92 respectively. In this alternative, another first and/or second conductive elements 64, 76 can energize the left or right heating grid 96, 98 which not being energized by the first and/or second conductive rails 34, 104. In another alternative, the first and/or second conductive elements 64, 76 energize the heating grid 54 of the sliding panel 28 and the first and/or second conductive rails 34, 104 energize both of the left and right heating grids 96, 98 of the first and second fixed panels 90, 92. Hence, the left and/or right heating grids 96, 98 of the first and/or second fixed panels 90, 92, respectively are energized through the first and/or second conductive rails 34, 104 with the heating grid 54 of the sliding panel 28 energized through the first and/or second conductive elements 64, 76. It is to be appreciated that the heating grid 54 of the sliding panel 28, as well as the left and right heating grids 96, 98 of the first and second fixed panels 90, 92, can each be energized by separate first and/or second conductive elements 64, 76.

The power supply of the vehicle 22 is electrically connected to at least one of the left and right heating grids 96, 98 for flowing current, i.e., electrical current, through the left and right heating grids 96, 98. Typically, the power supply is electrically connected to both the left and right heating grids 96, 98 for flowing current through the left and right heating grids 96, 98. More specifically, the power supply is electrically connected to the connectors 100 of the left and right heating grids 96, 98 for flowing current through the left and right heating grids 96, 98. The power supply can include a plurality of outputs, and for example, can include a first output electrically connected to the connector 100 coupled to the first end 56 of the left heating grid 96 and a second output electrically connected to the connector 100 coupled to the second end 58 of the left heating grid 96. Likewise, another first output is electrically connected to the connector 100 coupled to the first end 56 of the right heating grid 98 and another second output is electrically connected to the connector 100 of the second end 58 of the right heating grid 98. In other words, the left and right heating grids 96, 98 are electrically connected to the power supply independently of each other. As such, if the electrical connection is broken in the left heating grid 96, the right heating grid 98 will continue to operate, and vise versa. It is to be appreciated that any suitable switches, relays, etc. can be utilized to flow the current from the power supply to the first and/or second conductive rails 34, 104 and/or any other desired electrical/mechanical component(s) of the vehicle 22.

FIGS. 2, 17, and 18 illustrate configurations in which there are four connectors 100 such that there are two first outputs and two second outputs. FIGS. 14A, 14B, 16, 22 and 23 illustrate configurations in which there are two connectors 100 such that there is one first output and one second output. The first output of the power supply is a negative charge and the second output of the power supply is a positive charge. It is to be appreciated that the first output can be the positive charge and the second output can be the negative charge. Typically, the current is a direct current (DC). It is to be appreciated that any other suitable current can be utilized.

In certain embodiments, the power supply is electrically connected to the conductive rail 34 for flowing current through the conductive rail 34 and the left and/or right heating grids 96, 98. More specifically, the power supply is electrically connected to the first and/or second conductive rails 34, 104 and even more specifically, the first output is electrically connected to the first conductive rail 34 and the second output electrically connected to the second conductive rail 104. For example, referring to FIGS. 14B and 16, one of the connectors 100 is coupled to the first conductive rail 34 and another one of the connectors 100 is coupled to the second conductive rail 104 for allowing current to flow therethrough. In other words, one of the connectors 100 are coupled to respective first and second conductive rails 34, 104 such that the left and right heating grids 96, 98 are in continuous electrical connection to the first and second conductive rails 34, 104 in a parallel circuit. As such, the left and right heating grids 96, 98 are electrically connected to the first and second conductive rails 34, 104 and the center heating grid 54 of the sliding panel 28 is electrically connected to the conductive element 64 independently of the first and second conductive rails 34, 104.

Figure 14A:
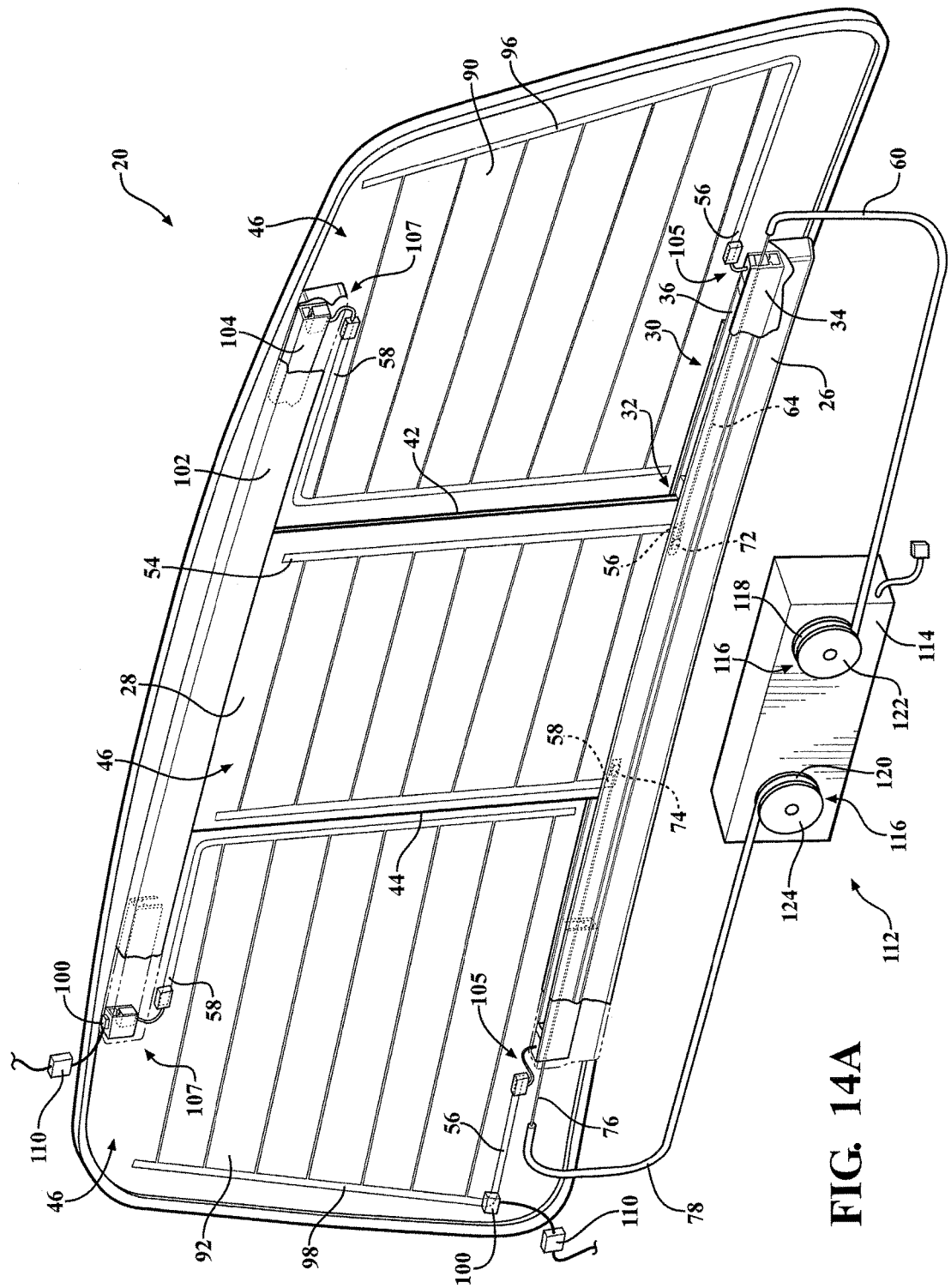
FIG. 14A is a perspective view of an interior of another sliding window assembly having a first fixed panel, a second fixed panel, and a sliding panel disposed therebetween in a closed position with a first conductive rail and a second conductive rail and a cable drive system including a motor having a first spool and a second spool with one connector coupled to the second conductive rail and another connector coupled to the first end of the right heating grid.

As another example, referring to FIG. 14A, one of the connectors 100 is coupled to one of the first and second conductive rails 34, 104 and another one of the connectors 100 is coupled to one of the left and right heating grids 96, 98 such that the left and right heating grids 96, 98 are in continuous electrical connection to the first and second conductive rails 34, 104 in the parallel circuit. Specifically, one of the connectors 100 is coupled to one of the first and second conductive rails 34, 104 and another one of the connectors 100 is coupled to one of the first and second ends 56, 58 of one of the left and right heating grids 96, 98. More specifically, FIG. 14A illustrates one of the connectors 100 coupled to the second conductive rail 104 and another one of the connectors 100 coupled to the first end 56 of the right heating grid 98. Typically, the power supply provides continuous flow of current through the left and right heating grids 96, 98 of the first and second fixed panels 90, 92 respectively. As such, if the electrical connection is broken in the left heating grid 96, the right heating grid 98 will continue to operate, and vise versa. As discussed above, the first output of the power supply is the negative charge and the second output of the power supply is the positive charge. It is to be appreciated that the first output can be the positive charge and the second output can be the negative charge. Typically, the current is direct current (DC). It is to be appreciated that any other suitable current can be utilized.

Figure 16:
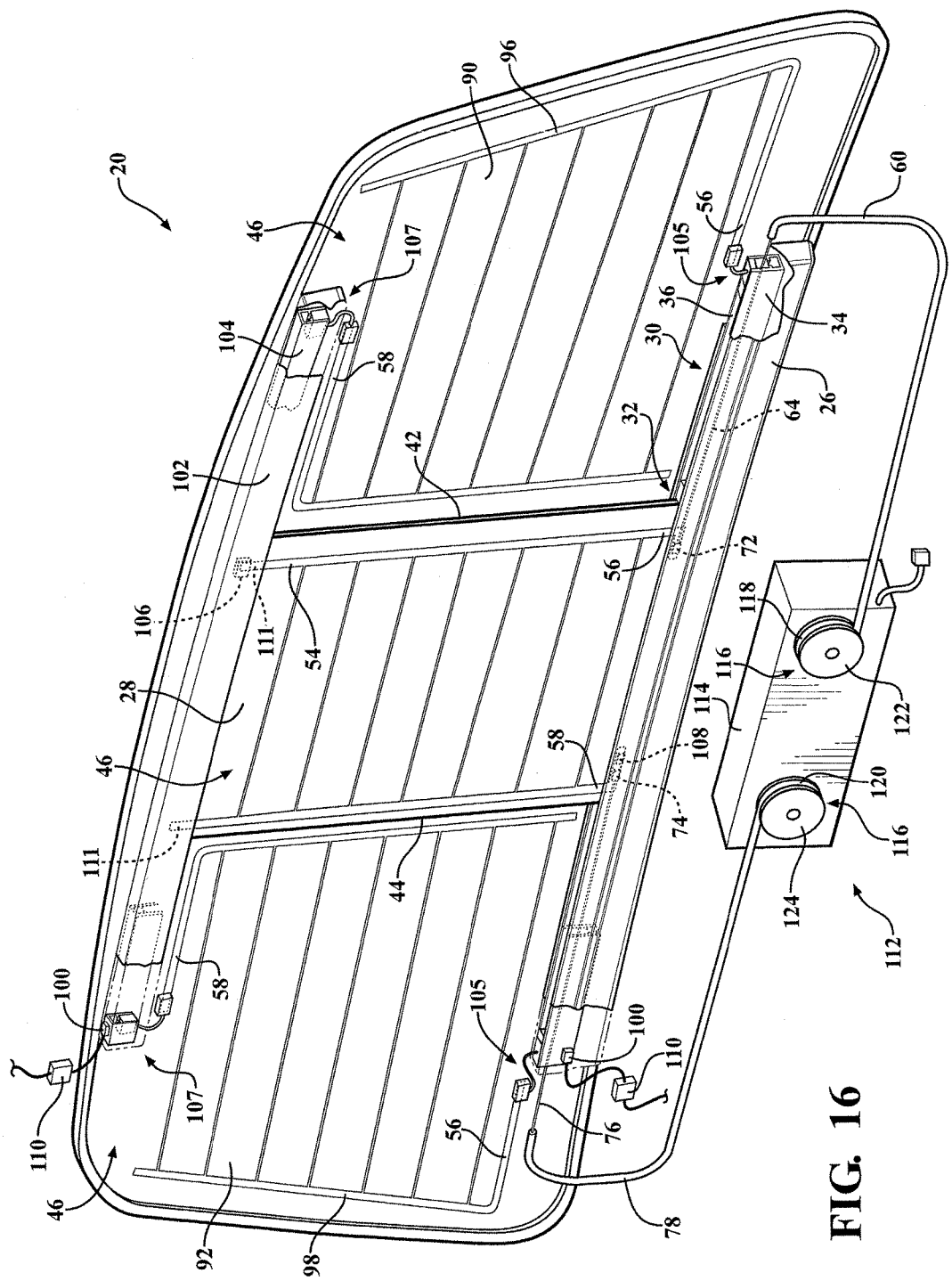
FIG. 16 is a perspective view of an interior of another sliding window assembly with the first and second conductive rails and the cable drive system having the first and second spools with a second upper connector and a second lower connector coupled to the sliding panel.

In one embodiment, as shown in FIG. 16, the heating grid 54 of the sliding panel 28 can also be electrically connected to the conductive rail 34, and more specifically the first and second conductive rails 34, 104 as disclosed in U.S. patent application Ser. No. 12/944,448 filed concurrently with the subject application. Typically, a second upper connector 106 and a second lower connector 108 are each coupled to the heating grid 54 of the sliding panel 28 and continuously engage the first and second conductive rails 34 respectively during movement of the sliding panel 28 such that the heating grid 54 of the sliding panel 28 remains electrically connected to the first and second conductive rails 34. The second lower connector 108 is coupled to one of the first and second ends 56, 58 of the sliding panel 28 and the second upper connector 106 is coupled to a third end 111 of the sliding panel. It is to be appreciated that the first, second, and third ends 56, 58, 111 of the heating grid 54 of the sliding panel 28 can be at any suitable location. It is to further be appreciated that the second upper and lower connectors 106, 108 can be coupled to the heating grid 54 of the sliding panel 28 at any suitable location. Typically, the second upper and lower connectors 106, 108 are coupled to the heating grid 54 of the sliding panel 28 by soldering. It is to be appreciated that the second upper and lower connectors 106, 108 can be coupled to the first, second, and/or third ends 56, 58, 111 of the heating grid 54 of the sliding panel 28 by welding, adhesive, and/or any other suitable method. It is to also be appreciated that the second upper and lower connectors 106, 108 can be coupled to the first and second conductive rails 34, 104 respectively such that the sliding panel 28 moves back and forth relative to the connectors 106, 108 and is further disclosed in U.S. patent application Ser. No. 12/944, 448 filed concurrently with the subject application. It is to further be appreciated that the first and/or second conductive rails 34, 104 as disclosed in U.S. patent application Ser. No. 12/944,448 filed concurrently with the subject application, and the conductive element 64 coupled with the cable 60, as disclosed herein, can be utilized together as shown in FIG. 16; thus providing a back-up mechanism for the heating grid 54 of the sliding panel 28.

Referring to FIGS. 2, 14A, 14B, 16-18, 22, and 23, a wire harness 110 is utilized to electrically connect the left and right heating grids 96, 98 of the first and second fixed panels 90, 92 to the power supply. Further, the wire harness 110 is utilized to electrically connect the first and second conductive rails 34, 104 to the power supply. In one example, as shown in FIGS. 2, 17, and 18, the wire harness 110 is coupled to the connectors 100 coupled to one of the left and right heating grids 96, 98. More specifically, FIGS. 2, 17, and 18 illustrate one wire harness 110 coupled to the connectors 100 coupled to the left heating grid 96 and another wire harness 110 coupled to the connectors 100 coupled to the right heating grid 98. As such, the center, left, and right heating grids 54, 96, 98 are electrically connected to the power supply independently of each other. In other words, current flows through the left heating grid 96 through the connectors 100 and one wire harness 110 and current flows through the right heating grid 98 through other connectors 100 and another wire harness 110 and additionally, current flows through the center heating grid 54 utilizing the conductive element 64 electrically connected to a motor 114 as discussed further below.

Figure 14B:
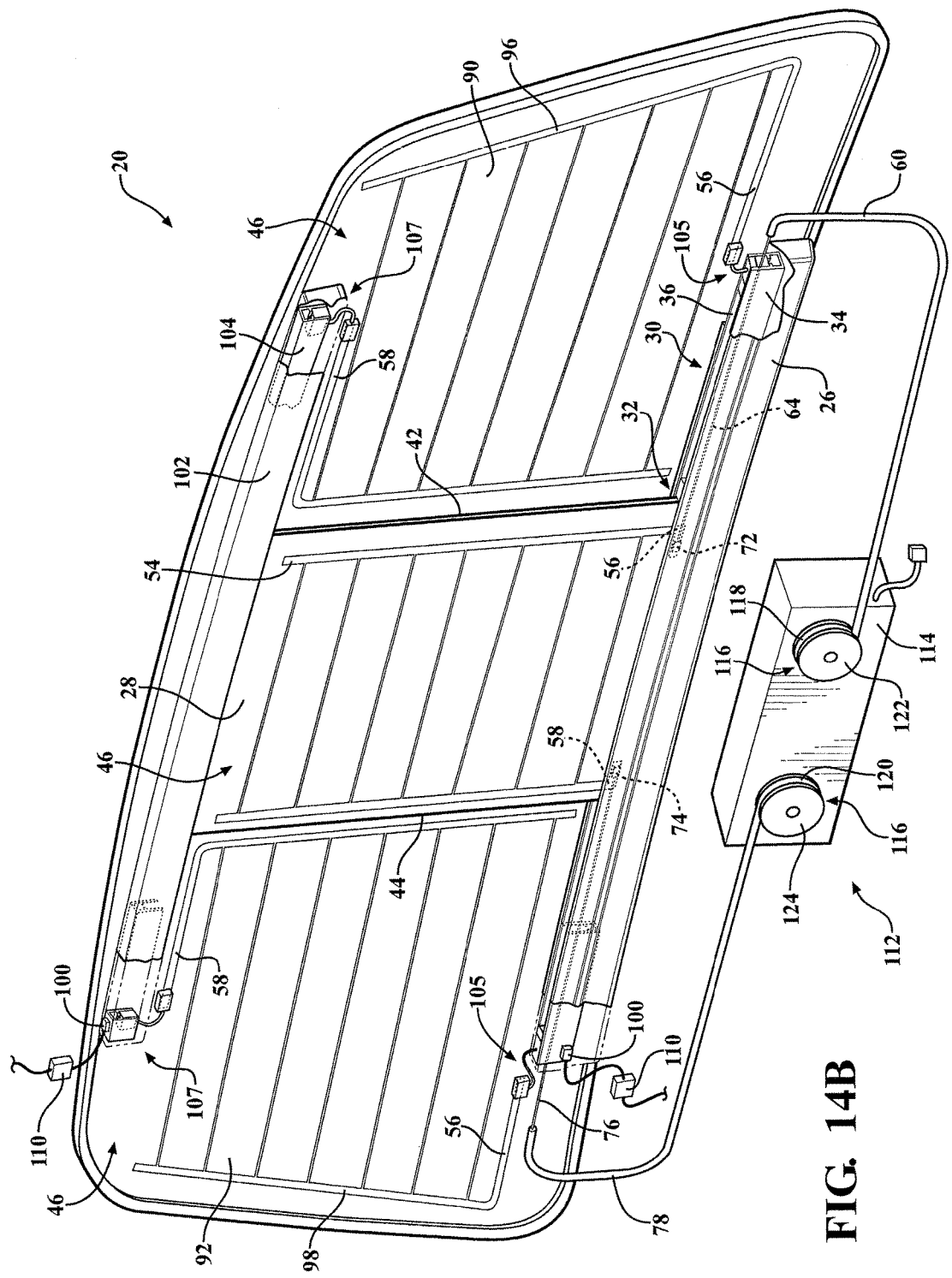
FIG. 14B is a perspective view of the interior of the sliding window assembly with the first and second conductive rails and the cable drive system having the first and second spools with one connector coupled to the first conductive rail and another connector coupled to the second conductive rail.
Figure 15:
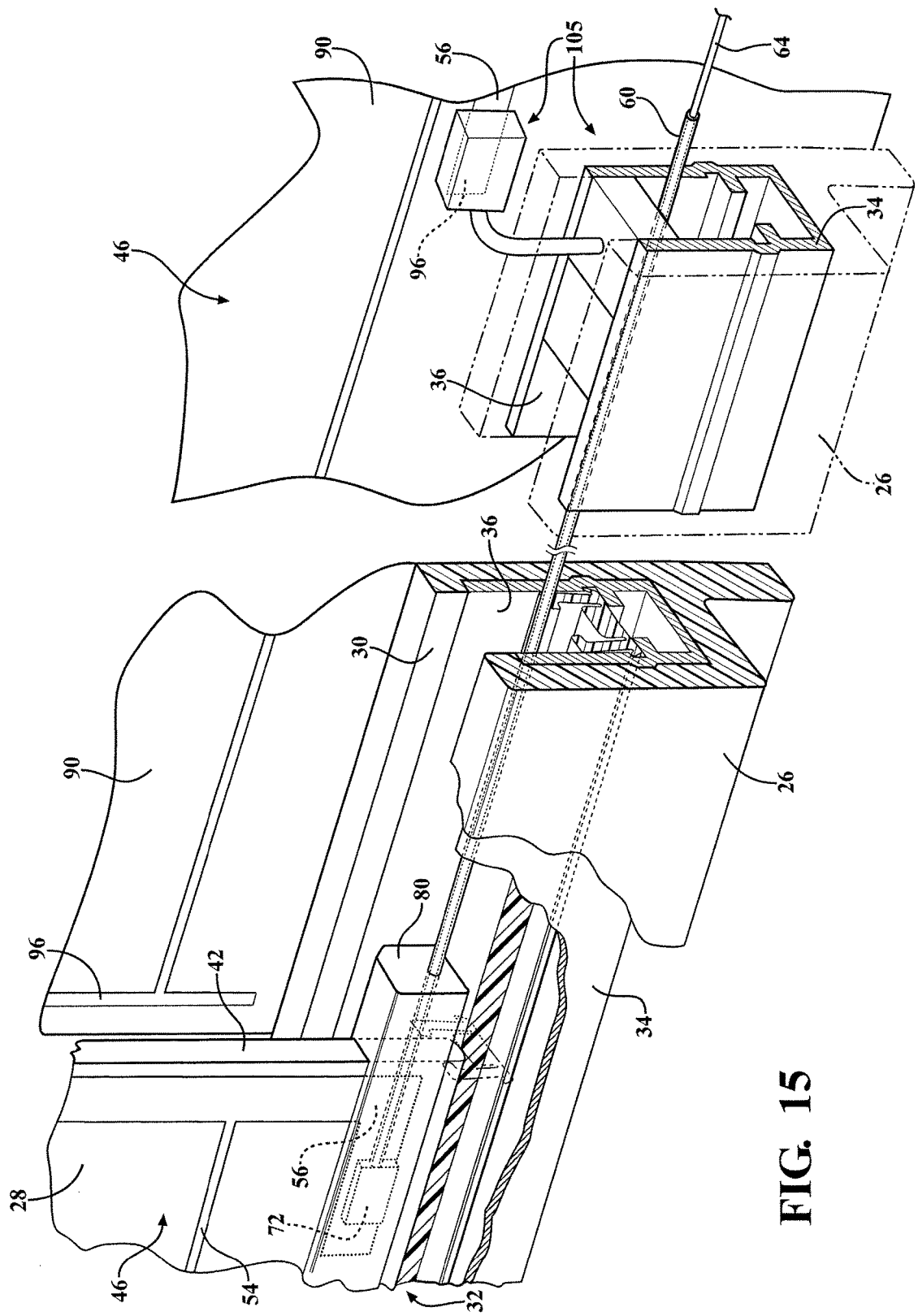
FIG. 15 is a perspective broken view of the conductive element and the cable coupled to the sliding panel with connectors coupled to the first conductive rail and the first fixed panel.

In another example, as shown in FIGS. 14B and 16, the wire harness 110 is coupled to the connectors 100 coupled to the first and second conductive rails 34, 104. In FIG. 14B, current flows through the left, and right heating grids 96, 98 utilizing the first and second conductive rails 34, 104. Therefore, the left and right heating grids 96, 98 are in continuous electrical connection to the first and second conductive rails 34, 104 in the parallel circuit such that current flows through the left and right heating grids 96, 98 independently of each other and independent of the left and right heating grids 96, 98, current flows through the center heating grid 54 utilizing the conductive element 64 electrically connected to the motor 114. As mentioned above, FIG. 16 illustrates the back-up mechanism for the center heating grid 54, therefore, the center, left, and right heating grids 54, 96, 98 are in continuous electrical connection to the first and second conductive rails 34, 104 in the parallel circuit such that current flows through the center, left, and right heating grids 54, 96, 98 independently of each other and additionally, current flows through the center heating grid 54 utilizing the conductive element 64 electrically connected to the motor 114.

In yet another example, as shown in FIG. 14A, the wire harness 110 is coupled to the connector 100 coupled to one of the left and right heating grids 96, 98 and the connector 100 coupled to one of the first and second conductive rails 34, 104. More specifically, FIG. 14A illustrates the wire harness 110 coupled to the connector 100 coupled to the right heating grid 98 and the connector 100 coupled to the second conductive rail 104. As such, current flows through the right heating grid 98 and the left heating grid 96 utilizing the first and second conductive rails 34, 104 and independent of the first and second conductive rails 34, 104, current flows through the center heating grid 54 utilizing the conductive element 64 electrically connected to the motor 114. In other words, current flows through the right heating grid 98, through one of the first and second conductive rails 34, 104, through the left heating grid 96, through the other one of the first and second conductive rails 34, 104 and out to the power supply and independently, current flows through the center heating grid 54 utilizing the conductive element 64 electrically connected to the motor 114. It is to be appreciated for FIG. 14A, one of the connectors 100 can be coupled to the left heating grid 96 instead of the right heating grid 98.

It is to be appreciated that the wire harness 110 can be coupled to the connectors 100 in any suitable location. It is to further be appreciated that any suitable mechanism can be utilized to flow current through the first and second conductive rails 34, 104 and the left and right heating grids 96, 98. It is to also be appreciated that current can flow through the entire first and second conductive rails 34, 104 or current can flow through a portion of the first and second conductive rails 34, 104.

Figure 22:
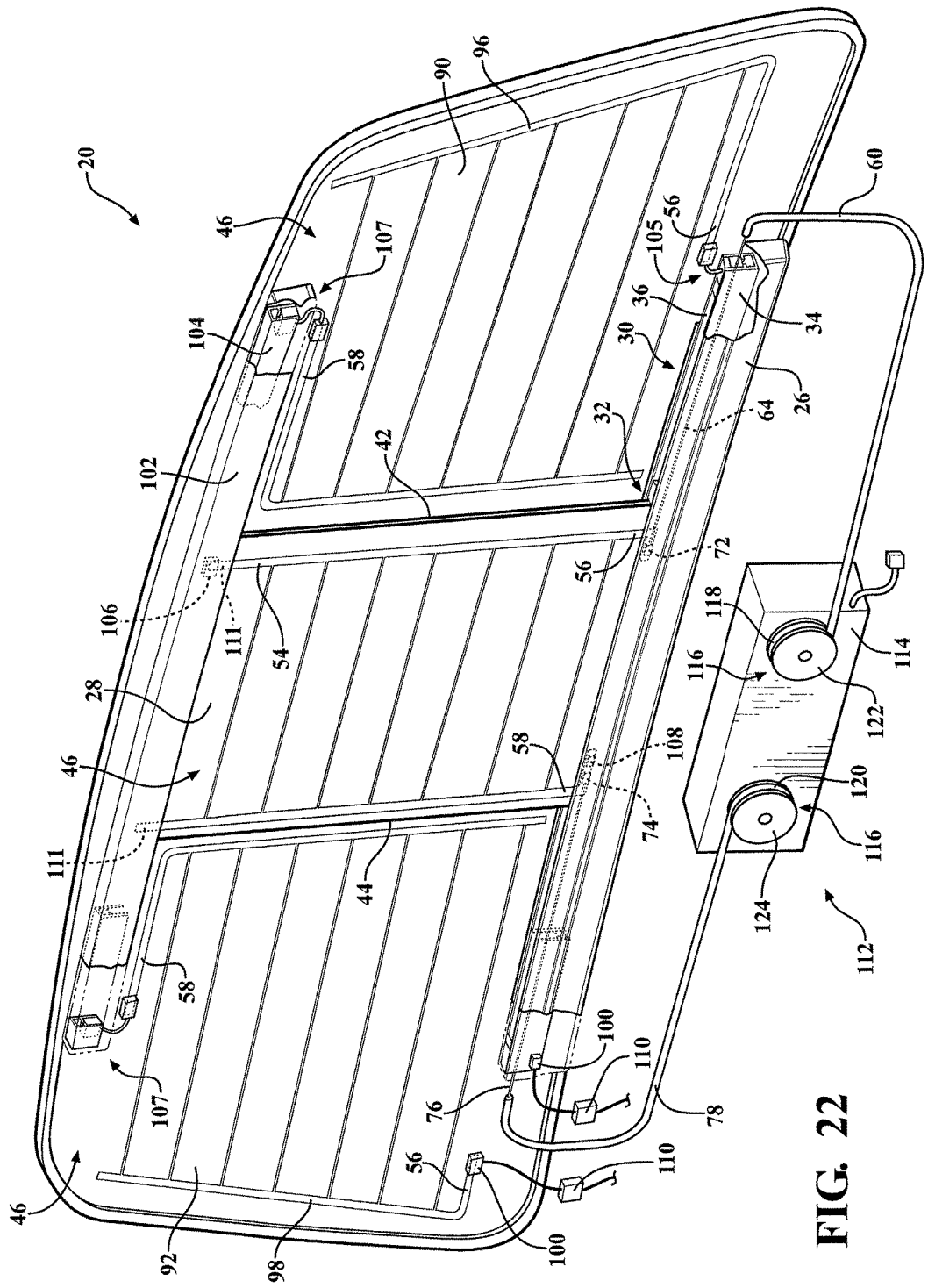
FIG. 22 is a perspective view of an interior of another sliding window assembly and a cable drive system with a left heating grid and a right heating grid electrically connected in a series circuit.
Figure 23:
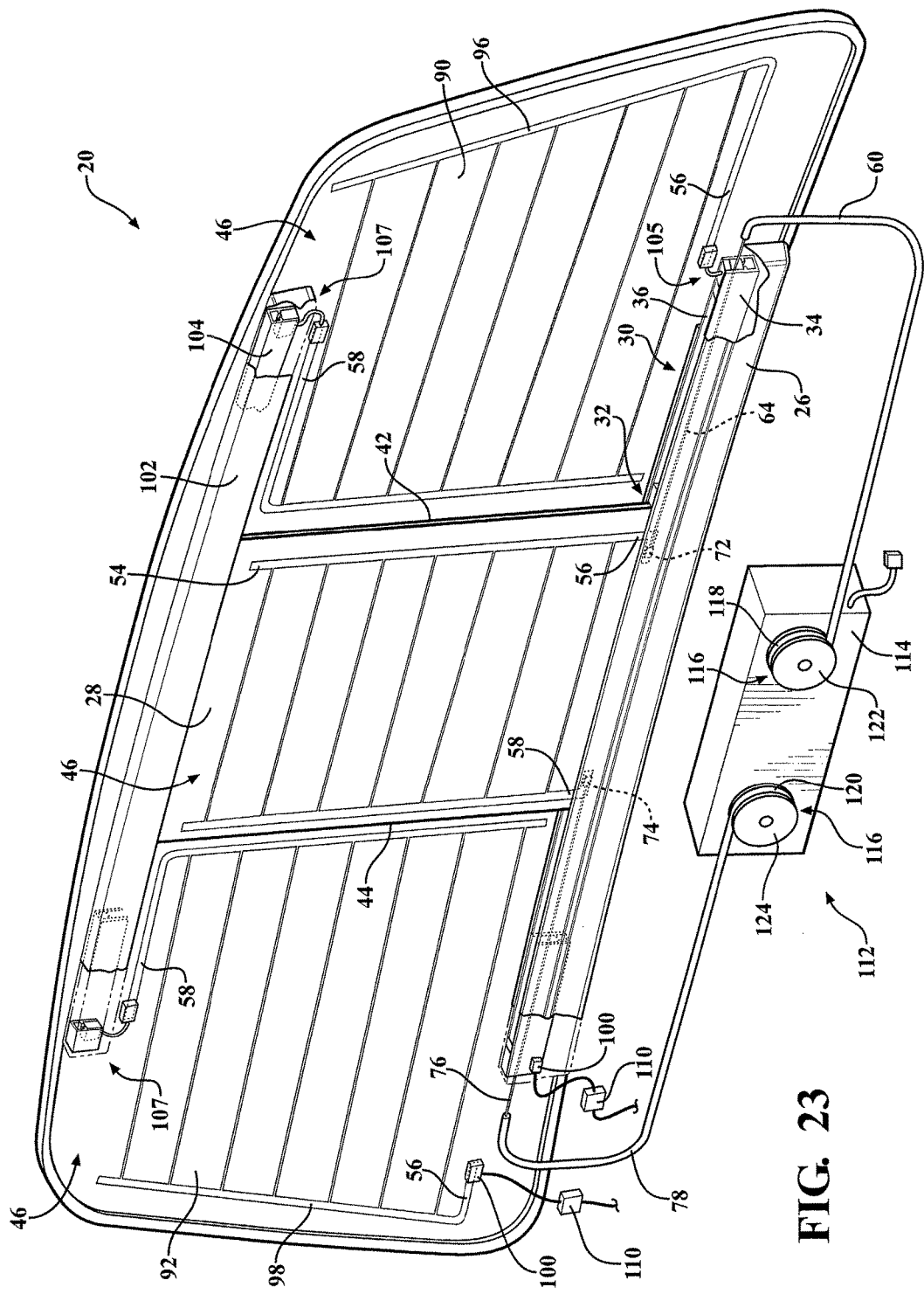
FIG. 23 is a perspective view of an interior of yet another sliding window assembly and the cable drive system with the left and right heating grids electrically connected in a series circuit.

In certain embodiments, as shown in FIGS. 22 and 23, the left and right heating grids 96, 98 are in continuous electrical connection to the conductive rail 34 in a series circuit. More specifically, the left and right heating grids 96, 98 are in continuous electrical connection to the first and second conductive rails 34, 104 in the series circuit. As such, current flows through one of the left and right heating grids 96, 98, through one of the first and second conductive rails 34, 104, through the other one of the left and right heating grids 96, 98, through the other one of the first and second conductive rails 34, 104 and out to the power supply.

FIGS. 22 and 23 illustrate one of the connectors 100 coupled to one of the first and second conductive rails 34, 104 and another one of the connectors 100 coupled to one of the left and right heating grids 96, 98 such that the left and right heating grids 96, 98 are in continuous electrical connection in the series circuit. More specifically, FIGS. 22 and 23 illustrate one connector 100 coupled to the first end 56 of the right heating grid 98 and another connector 100 coupled to the first conductive rail 34. For the embodiment of FIGS. 22 and 23, one of the first lower and upper connectors 105, 107 can be eliminated. For example, one of the first lower connectors 105 has been eliminated such that current flows through the left and right heating grids 96, 98 in the series circuit.

Further, FIG. 22 illustrates utilizing the second upper and lower connectors 106, 108 electrically connected to the first and second conductive rails 34, 104. Hence, the center heating grid 54 is in the parallel circuit with the left heating grid 96 and the center heating grid 54 is in the series circuit with the right heating grid 98. In addition, FIG. 22 illustrates the back-up mechanism of energizing the center heating grid 54 in two different ways. As such, current can also flow through the center heating grid 54 independently of the left and right heating grids 96, 98 utilizing the conductive element 64 electrically connected to the motor 114. It is to be appreciated that for any of these embodiments/alternatives, the back-up mechanism is optional. Additionally, FIG. 23 illustrates that current can also flow through the center heating grid 54 independently of the left and right heating grids 96, 98 utilizing the conductive element 64 electrically connected to the motor 114 without utilizing the back-up mechanism.

Referring to FIGS. 2, 14A, 14B, 16-18, 22, and 23, a cable drive system 112 for the sliding panel 28 having the heating grid 54 is generally shown. The cable drive system 112 includes the cable 60 and the conductive element 64 coupled with the cable 60 for electrically connecting to the heating grid 54 of the sliding panel 28 as discussed above. The cable 60 is movable between a first position and a second position corresponding to the movement of the sliding panel 28. In other words, when the cable 60 moves to the first position, the sliding panel 28 moves to the open position and when the cable 60 moves to the second position, the sliding panel 28 moves to the closed position. It is to be appreciated that any of the conductive rail 34, 104 embodiments/alternatives as disclosed in U.S. patent application Ser. No. 12/944,448 filed concurrently with the subject application, can be utilized with the cable drive system 112 and/or the sliding window assembly 20 of the subject invention.

The cable drive system 112 includes the motor 114 electrically connected to the power supply of the vehicle 22. The power supply also provides current to the motor 114 for allowing the motor 114 to move the sliding panel 28 while also providing current to the conductive element 64. The cable 60 is coupled to the motor 114 and adapted to be connected to the sliding panel 28. In addition, the conductive element 64 is coupled to the motor 114. As such, the power supply provides current to the motor 114 and the conductive element 64 and therefore to the center heating grid 54 and independently, the power supply also provides current to the left and right heating grids 96, 98 and/or the first and second conductive rails 34, 104. As mentioned above, it is to be appreciated that any suitable switches, relays, etc. can be utilized to flow the current from the power supply to the motor 114 and/or first and second conductive rails 34, 104, etc. and/or any other desired electrical/mechanical component(s) of the vehicle 22. It is to be appreciated that a plurality of power supplies can be utilized to provide current to any desired electrical/mechanical component(s) of the vehicle 22.

The conductive element 64 is movable concurrently with the cable 60 between the first and second positions. As discussed above, the conductive element 64 includes the first terminal end 72 coupled to the first end 56 of the heating grid 54 and the second terminal end 74 coupled to the second end 58 of the heating grid 54 for electrically connecting the heating grid 54 to the conductive element 64. Hence, the heating grid 54 of the sliding panel 28 remains electrically connected to the conductive element 64 in both the open and closed positions.

The conductive element 64 includes a proximal end portion 116 coupled to and electrically connected to the motor 114. In certain embodiments, the proximal end portion 116 further includes a first proximal end 118 and a second proximal end 120 with the first conductive element 64 having the first proximal end 118 and the second conductive element 76 having the second proximal end 120 such that each of the first and second proximal ends 118, 120 are coupled to and electrically connected to the motor 114.

As shown in FIGS. 2, 14A, 14B, 16, 22, and 23, in one alternative, the motor 114 includes a first spool or drum 122 and a second spool or drum 124 spaced from each other and each movable independent of each other. The first and second spools 122, 124 move the first and second cables 60, 78 between the first and second positions and thus moves the sliding panel 28 between the open and closed position. The first proximal end 118 of the first conductive element 64 is coupled to the first spool 122 and the second proximal end 120 of the second conductive element 76 is coupled to the second spool 124. Likewise, the first and second cables 60, 78 are coupled to the first and second spools 122, 124, respectively. Current flows through the first and second spools 122, 124 to energize the heating grid 54 of the sliding panel 28. Hence, current flows through the first and second spools 122, 124, the first and second conductive elements 64, 76 and the heating grid 54 of the sliding panel 28.

A first output is electrically connected to the first spool 122 and a second output electrically connected to the second spool 124. For example, the first output is a positive charge and the second output is a negative charge. It is to be appreciated that the first output can be the negative charge and the second output can be the positive charge. Typically, the current is a direct current (DC). It is to be appreciated that any other suitable current can be utilized.

To move the sliding panel 28 to the open position, the first spool 122 rotates in a first direction which unwinds the first cable 60 and the first conductive element 64 on the first spool 122 while the second spool 124 rotates in a second direction opposite the first direction which winds up the second cable 78 and the second conductive element 76 on the second spool 124. Simply stated, the second cable 78 pulls the sliding panel 28 to the open position. Likewise, to move the sliding panel 28 to the closed position, the first spool 122 rotates in the second direction which winds up the first cable 60 and the first conductive element 64 on the first spool 122 and the second spool 124 rotates in the first direction which unwinds the second cable 78 and the second conductive element 76 on the second spool 124. Simply stated, the first cable 60 pulls the sliding panel 28 to the closed position. The heating grid 54 of the sliding panel 28 remains electrically connected to the first and second conductive elements 64, 76 during rotation of the first and second spools 122, 124, when the sliding panel 28 moves between the open and closed positions. In other words, the heating grid 54 of the sliding panel 28 remains electrically connected to the first and second conductive elements 64, 76 during movement of the sliding panel 28 between the open and closed positions. Typically, the first direction is counter-clockwise and the second direction is clockwise. It is to be appreciated that the first direction can be clockwise and the second direction can be counter-clockwise.

The first and second cables 60, 78 and hence the first and second conductive elements 64, 76 can be wrapped around the first and second spools 122, 124, respective in any suitable manner for moving the sliding panel 28 between the open and closed positions. It is to also be appreciated that the first and second spools 122, 124 can rotate in the same direction to wind or unwind the first and second cables 60, 78. Hence, when the first and second spools 122, 124 rotate in the same direction, the manner in which at least one of the first and second cables 60, 78 and thus the first and second conductive elements 64, 76 are wrapped around at least one of the first and second spools 122, 124 changes. The motor 114 configuration discussed above is commonly referred to as a pull-pull cable system as known to those skilled in the art. It is to be appreciated that any suitable motor 114 can be utilized to move the sliding panel 28 between the open and closed positions.

In another alternative, as shown in FIG. 17, the motor 114 includes only the first spool 122 with the cable 60 and the conductive element 64 coupled only to the first spool 122. In other words, the second spool 124 is eliminated. In this configuration, the first and second cables 60, 78 are coupled to the first spool 122. Likewise, the first and second proximal ends 118, 120 of the first and second conductive elements 64, 76, respectively, are coupled to the first spool 122. Typically, in this configuration, the first and second cables 60, 78 and hence the first and second conductive elements 64, 76 are wrapped around the first spool 122 in opposite directions. For example, if the first direction is clockwise, rotation of the first spool 122 in the first direction moves the sliding panel 28 to the open position and if the second direction is counter-clockwise, rotation of the first spool 122 in the second direction moves the sliding panel 28 to the closed position.

Current flows through the first spool 122 to energize the heating grid 54 of the sliding panel 28. In other words, current flows through the first spool 122, the first and second conductive elements 64, 76 and the heating grid 54 of the sliding panel 28. Hence, the first and second outputs are in electrical connection to the first spool 122 such that the first and second conductive elements 64, 76 are in electrical connection to the first and second outputs, respectively. The heating grid 54 of the sliding panel 28 remains electrically connected to the first and second conductive elements 64, 76 during rotation of the first spool 122, when the sliding panel 28 moves between the open and closed positions. In other words, the heating grid 54 of the sliding panel 28 remains electrically connected to the first and second conductive elements 64, 76 during movement of the sliding panel 28 between the open and closed positions. The first and second cables 60, 78 and hence the first and second conductive elements 64, 76 can be wrapped around the first spool 122 in any suitable manner for moving the sliding panel 28 between the open and closed positions.

Typically, the motor 114 is the pull-pull cable system as discussed above. As such, to move the sliding panel 28 to the open position and the first direction is clockwise, the first spool 122 rotates in the first direction which unwinds the first cable 60 and the first conductive element 64 on the first spool 122 while the second cable 78 and the second conductive element 76 winds up on the first spool 122. Simply stated, the second cable 78 pulls the sliding panel 28 to the open position. Likewise, to move the sliding panel 28 to the closed position and the second direction is counter-clockwise, the first spool 122 rotates in the second direction which winds up the first cable 60 and the first conductive element 64 on the first spool 122 while the second cable 78 and the second conductive element 76 unwinds on the first spool 122. Simply stated, the first cable 60 pulls the sliding panel 28 to the closed position. It is to be appreciated that the first direction can be counter-clockwise and the second direction can be clockwise.

In yet another alternative, as shown in FIG. 18, the motor 114 again includes only the first spool 122 with the cable 60 and the conductive element 64 coupled only to the first spool 122. In other words, the second spool 124 is eliminated. In this configuration, the cable 60 appears to be one piece. The cable 60 is only wrapped around a portion of the first spool 122 such that the cable 60 is coupled to the first spool 122 by a friction fit. Further, the cable 60 is under tension for this configuration. As such, rotation of the first spool 122 causes the cable 60 to move back and forth along a portion of the first spool 122 instead of completely wrapping around the first spool 122.

Figure 19:
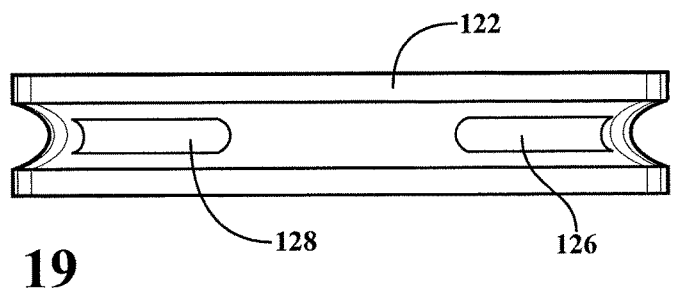
FIG. 19 is a plan view of the first spool of FIG. 18 including a first conductive part and a second conductive part.
Figure 20:
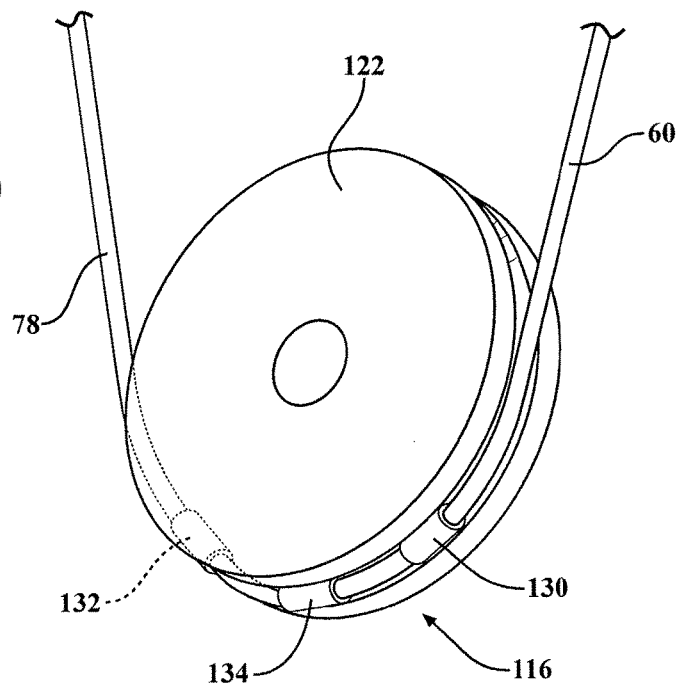
FIG. 20 is a perspective view of the first spool of FIG. 18 with a conductive element including a first connector, a second connector, and an insulator disposed between the first and second connectors.
Figure 21:
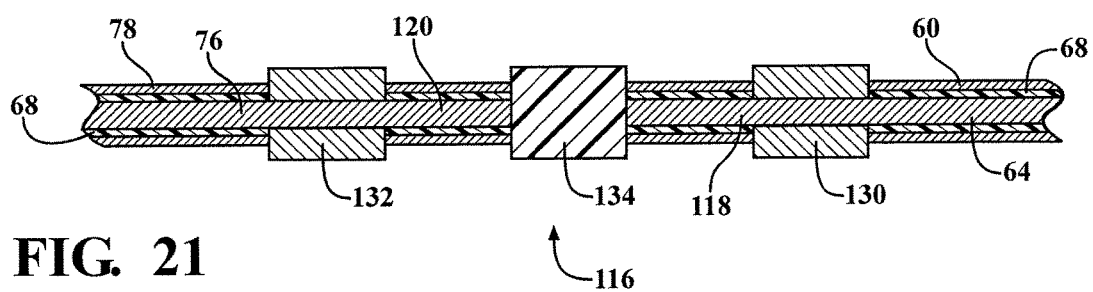
FIG. 21 is a cross-sectional view of the cable and the conductive element including the insulator disposed between the first and second connectors.

In this configuration, as shown in FIG. 19, the first spool 122 includes a first conductive part 126 and a second conductive part 128 spaced from each other and each in electrical connection to the conductive element 64. More specifically, the first and second conductive parts 126, 128 are in electrically connection to the proximal end portion 116 of the conductive element 64. Turning to FIGS. 20 and 21, the conductive element 64 includes a first connector 130 electrically connected to the first conductive part 126 and a second connector 132 spaced from the first connector 130 and electrically connected to the second conductive part 128. In other words, the first connector 130 engages the first conductive part 126 and the second connector 132 engages the second conductive part 128. More specifically, the first proximal end 118 is coupled to the first connector 130 which engages the first conductive part 126 and the second proximal end 120 is coupled to the second connector 132 which engages the second conductive part 128.

The conductive element 64 also includes an insulator 134 disposed between the first and second connectors 130, 132. More specifically, the insulator 134 separates the conductive element 64 into the first and second conductive elements 64, 76; therefore, the first conductive element 64 is electrically connected to the first connector 130 and the second conductive element 76 is electrically connected to the second connector 132. The first and second conductive elements 64, 76 are separated for directing current from the first conductive element 64, through the heating grid 54 of the sliding panel 28, and back out the second conductive element 76, or vise versa. In other words, the insulator 134 prevents current from flowing from the first connector 130 to the second connector 132 without flowing through the heating grid 54 of the sliding panel 28. In one configuration, the insulator 134 also separates the cable 60; thus splitting the cable 60 into the first and second cables 60, 78. It is to be appreciated that the insulator 134 can also separate the first and/or second sheaths 68, 70. It is to further be appreciated that the first and/or second sheaths 68, 70 can be one continuous piece.

The insulator 134 is typically formed of polymeric material(s). The polymeric material(s) can be further defined as a plastic material and/or any other suitable material(s). It is to be appreciated that the insulator 134 can be formed of any non-conductive material(s).

Again, typically, the motor 114 is the pull-pull cable system as discussed above. As such, to move the sliding panel 28 to the open position and the first direction is counter-clockwise, the first spool 122 rotates in the first direction which pulls the second cable 78 along the first spool 122. Simply stated, the second cable 78 pulls the sliding panel 28 to the open position. Likewise, to move the sliding panel 28 to the closed position and the second direction is clockwise, the first spool 122 rotates in the second direction which pulls the first cable 60 along the first spool 122. Simply stated, the first cable 60 pulls the sliding panel 28 to the closed position. It is to be appreciated that the first direction can be clockwise and the second direction can be counter-clockwise. For this first spool 122 configuration only, current only flows through the heating grid 54 of the sliding panel 28 when the sliding panel 28 is in the closed position. It is to be appreciated that current can flow through the heating grid 54 in the open position instead of the closed position. In other words, for this first spool 122 configuration, current only flows through the heating grid 54 of the sliding panel 28 in one single position. Hence, when the first and second conductive parts 126, 128 of the first spool 122 rotate such that the electrical connection is broken with the first and second connectors 130, 132 of the first and second conductive elements 64, 76, current will no longer flow through the heating grid 54 of the sliding panel 28.

It is to be appreciated for any of the embodiments/alternatives discussed above, guides can be used for positioning and/or guiding the first and/or second cables 60, 78 and the first and/or second conductive elements 64, 76 between the motor 114 and the sliding panel 28. For illustrative purposes only, some of the details of at least FIGS. 2, 14A, 14B, 15-18, 22, and 23 are not shown for illustrating other components of the subject invention. It is to be appreciated that various mechanical and electrical components of the subject invention can be re-orientated or relocated to accommodate various mechanical and electrical components as disclosed in the embodiments/alternatives of U.S. patent application Ser. No. 12/944,448 filed concurrently with the subject application.

Many modifications and variations of the subject invention are possible in light of the above teachings. The foregoing invention has been described in accordance with the relevant legal standards; thus, the description is exemplary rather than limiting in nature. Variations and modifications to the disclosed embodiment can become apparent to those skilled in the art and do come within the scope of the invention. Accordingly, the scope of legal protection afforded this invention can only be determined by studying the following claims.

What is claimed is:

1. A sliding window assembly for a vehicle, said assembly comprising:
a track adapted to be coupled to the vehicle;
a sliding panel coupled to said track and movable relative to said track between an open position and a closed position;
a heating grid coupled to said sliding panel for defrosting said sliding panel;
a cable coupled to said sliding panel for moving said sliding panel between said open and closed positions; and
a conductive element electrically connected to said heating grid and directly connected with said cable such that said conductive element moves concurrently with said cable as said cable moves said sliding panel between said open and closed positions.

2. A sliding window assembly as set forth in claim 1 wherein said cable defines a hollow receiving said conductive element with said cable surrounding said conductive element.

3. A sliding window assembly as set forth in claim 2 further including a first sheath surrounding said conductive element with said first sheath disposed between said cable and said conductive element.

4. A sliding window assembly as set forth in claim 1 further including a first sheath surrounding said cable.

5. A sliding window assembly as set forth in claim 4 wherein said first sheath surrounds both said cable and said conductive element.

6. A sliding window assembly as set forth in claim 5 wherein said cable defines a hollow receiving said conductive element with said cable surrounding said conductive element.

7. A sliding window assembly as set forth in claim 1 wherein said heating grid includes a first end and a second end spaced from each other and wherein said conductive element includes a first terminal end coupled to said first end and a second terminal end coupled to said second end for electrically connecting said heating grid to said conductive element.

8. A sliding window assembly as set forth in claim 7 wherein said conductive element is further defined as a first conductive element having said first terminal end coupled to said first end of said heating grid and further including a second conductive element having said second terminal end coupled to said second end of said heating grid.

9. A sliding window assembly as set forth in claim 8 wherein said cable is further defined as a first cable coupled with said first conductive element for moving said sliding panel to said closed position and further including a second cable coupled with said second conductive element for moving said sliding panel to said open position such that said first conductive element moves concurrently with said first cable and said second conductive element moves concurrently with said second cable.

10. A sliding window assembly as set forth in claim 9 wherein each of said first and second cables define a hollow with said hollow of said first cable receiving said first conductive element such that said first cable surrounds said first conductive element and said hollow of said second cable receiving said second conductive element such that said second cable surrounds said second conductive element.

11. A sliding window assembly as set forth in claim 10 further including a plurality of first sheaths with one of said first sheaths surrounding said first cable and another one of said first sheaths surrounding said second cable.

12. A sliding window assembly as set forth in claim 10 further including a plurality of first sheaths with one of said first sheaths surrounding said first conductive element such that said one of said first sheaths is disposed between said first cable and said first conductive element and another one of said first sheaths surrounding said second conductive element such that said another one of said first sheaths is disposed between said second cable and said second conductive element.

13. A sliding window assembly as set forth in claim 9 further including a bracket coupled to said sliding panel with said first and second cables coupled to said bracket to enable said first and second cables to move said bracket which moves said sliding panel between said open and closed positions.

14. A sliding window assembly as set forth in claim 13 wherein said first and second cables and said first and second conductive elements each define a first common predetermined length overlapping said sliding panel to electrically connect said first and second conductive elements to respective first and second ends of said heating grid.

15. A sliding window assembly as set forth in claim 14 wherein said first and second cables and said first and second conductive elements each define a second common predetermined length mounted to said bracket such that said bracket supports said first and second cables as said cables move said bracket which moves said sliding panel between said open and closed positions with said second common predetermined length greater than said first common predetermined length.

16. A sliding window assembly as set forth in claim 13 wherein said first and second terminal ends electrically connect said heating grid to each of said first and second conductive elements with said first terminal end of said first conductive element extending outwardly away from said first cable to enable said first terminal end to be exposed to said first end of said heating grid and said second terminal end of said second conductive element extending outwardly away from said second cable to enable said second terminal end to be exposed to said second end of said heating grid.

17. A sliding window assembly as set forth in claim 16 wherein said bracket defines a first pocket receiving said first terminal end of said first conductive element for positioning said first terminal end into engagement with said first end of said heating grid and a second pocket receiving said second terminal end of said second conductive element for positioning said second terminal end into engagement with said second end of said heating grid.

18. A sliding window assembly as set forth in claim 1 further including a first fixed panel and a second fixed panel spaced from each other to define an opening therebetween with said sliding panel movably relative to said first and second fixed panels between said open position uncovering said opening and said closed position covering said opening and further including a left heating grid coupled to said first fixed panel for defrosting said first fixed panel and a right heating grid coupled to said second fixed panel for defrosting said second fixed panel.

19. A sliding window assembly as set forth in claim 18 wherein said track is further defined as a first track and further including a second track spaced from said first track with said second track coupled to said first and second fixed panels and further including a first conductive rail coupled to said first track and a second conductive rail coupled to said second track such that said first and second conductive rails are in electrical connection to said left and right heating grids.

20. A sliding window assembly as set forth in claim 19 wherein said left and right heating grids are electrically connected to said first and second conductive rails and said heating grid of said sliding panel is electrically connected to said conductive element independently of said first and second conductive rails.

21. A cable drive system for a sliding panel having a heating grid, said system comprising:
a motor;
a cable coupled to said motor and adapted to be connected to the sliding panel with said cable movable between a first position and a second position; and
a conductive element directly connected with said cable for electrically connecting to the heating grid of the sliding panel with said conductive element movable concurrently with said cable between said first and second positions.

22. A cable drive system as set forth in claim 21 wherein said cable defines a hollow receiving said conductive element with said cable surrounding said conductive element.

23. A cable drive system as set forth in claim 22 further including a first sheath surrounding said conductive element with said first sheath disposed between said cable and said conductive element.

24. A cable drive system as set forth in claim 21 wherein said cable is further defined as a first cable and further includes a second cable and wherein said conductive element is further defined as a first conductive element coupled with said first cable and further includes a second conductive element coupled with said second cable for moving the sliding panel such that said first conductive element moves concurrently with said first cable and said second conductive element moves concurrently with said second cable.

25. A cable drive system as set forth in claim 24 wherein each of said first and second cables define a hollow with said hollow of said first cable receiving said first conductive element such that said first cable surrounds said first conductive element and said hollow of said second cable receiving said second conductive element such that said second cable surrounds said second conductive element.

26. A cable drive system as set forth in claim 25 further including a plurality of first sheaths with one of said first sheaths surrounding said first cable and another one of said first sheaths surrounding said second cable.

27. A cable drive system as set forth in claim 25 further including a plurality of first sheaths with one of said first sheaths surrounding said first conductive element such that said one of said first sheaths is disposed between said first cable and said first conductive element and another one of said first sheaths surrounding said second conductive element such that said another one of said first sheaths is disposed between said second cable and said second conductive element.

28. A cable drive system as set forth in claim 21 wherein said conductive element includes a proximal end portion coupled to and electrically connected to said motor.

29. A cable drive system as set forth in claim 28 wherein said conductive element is further defined as a first conductive element and further including a second conductive element and wherein said proximal end portion further includes a first proximal end and a second proximal end with said first conductive element having said first proximal end and said second conductive element having said second proximal end such that each of said first and second proximal ends are coupled to and electrically connected to said motor.

30. A sliding window assembly for a vehicle, said assembly comprising:
a first fixed panel adapted to be fixed to the vehicle;
a second fixed panel adapted to be fixed to the vehicle and spaced from said first fixed panel to define an opening therebetween;
a track coupled to said first and second fixed panels;
a sliding panel movably coupled to said track such that said sliding panel moves relative to said first and second fixed panels between an open position uncovering said opening and a closed position covering said opening;
a heating grid coupled to said sliding panel for defrosting said sliding panel;
a cable coupled to said sliding panel for moving said sliding panel between said open and closed positions; and
a conductive element electrically connected to said heating grid and directly connected with said cable such that said conductive element moves concurrently with said cable as said cable moves said sliding panel between said open and closed positions.

31. A sliding window assembly as set forth in claim 30 wherein said cable defines a hollow receiving said conductive element with said cable surrounding said conductive element.

32. A sliding window assembly as set forth in claim 31 further including a first sheath surrounding said conductive element with said first sheath disposed between said cable and said conductive element.

33. A sliding window assembly as set forth in claim 30 wherein said sliding panel includes a bottom portion at least partially disposed in said track and further including a bracket coupled to said bottom portion of said sliding panel with said cable further defined as a first cable and further including a second cable with said first and second cables coupled to said bracket to enable said first and second cables to move said bracket which moves said sliding panel between said open and closed positions.

34. A sliding window assembly as set forth in claim 33 wherein said first and second cables and said first and second conductive elements each define a first common predetermined length overlapping said sliding panel to electrically connect said first and second conductive elements to said heating grid.

35. A sliding window assembly as set forth in claim 34 wherein said first and second cables and said first and second conductive elements each define a second common predetermined length mounted to said bracket such that said bracket supports said first and second cables as said cables move said bracket which moves said sliding panel between said open and closed positions with said second common predetermined length greater than said first common predetermined length.

36. A sliding window assembly as set forth in claim 30 further including a left heating grid coupled to said first fixed panel for defrosting said first fixed panel and a right heating grid coupled to said second fixed panel for defrosting said second fixed panel with said track including a conductive rail in electrical connection to said left and right heating grids.

37. A sliding window assembly as set forth in claim 36 wherein said track is further defined as a first track and further including a second track spaced from said first track with said second track coupled to said first and second fixed panels and wherein said conductive rail is further defined as a first conductive rail coupled to said first track and further including a second conductive rail coupled to said second track such that said first and second conductive rails are in electrical connection to said left and right heating grids.

38. A sliding window assembly as set forth in claim 36 wherein said left and right heating grids are in continuous electrical connection to said conductive rail in a series circuit.

39. A sliding window assembly as set forth in claim 37 further including a plurality of connectors with one of said connectors coupled to one of said first and second conductive rails and another one of said connectors coupled to one of said left and right heating grids such that said left and right heating grids are in continuous electrical connection in a series circuit.

40. A sliding window assembly as set forth in claim 37 further including a plurality of connectors with one of said connectors coupled to said first conductive rail and another one of said connectors coupled to said second conductive rail such that said left and right heating grids are in continuous electrical connection to said first and second conductive rails in a parallel circuit.

41. A sliding window assembly as set forth in claim 37 further including a plurality of connectors with one of said connectors coupled to one of said first and second conductive rails and another one of said connectors coupled to one of said left and right heating grids such that said left and right heating grids are in continuous electrical connection to said first and second conductive rails in a parallel circuit.

42. A sliding window assembly as set forth in claim 37 wherein said left and right heating grids are electrically connected to said first and second conductive rails and said heating grid of said sliding panel is electrically connected to said conductive element independently of said first and second conductive rails.

* * * * *

UNITED STATES PATENT AND TRADEMARK OFFICE
CERTIFICATE OF CORRECTION

PATENT NO. : 10,015,842 B2
APPLICATION NO. : 12/944444
DATED : July 3, 2018
INVENTOR(S) : Daniel Bennett et al.

Page 1 of 1

It is certified that error appears in the above-identified patent and that said Letters Patent is hereby corrected as shown below:

On the Title Page

Related U.S. Application Data, please delete "Continuation-in-part of application No. 12/906,444, filed on Oct. 18, 2010, now abandoned, which is a continuation-in part of application No. 12/906,440, filed on Oct. 18, 2010, now abandoned." and replace with -- Continuation-in-part of application No. 12/906,444, filed on Oct. 18, 2010, now abandoned, Continuation-in part of application No. 12/906,440, filed on Oct. 18, 2010, now abandoned. --

Signed and Sealed this
Second Day of October, 2018

Andrei Iancu
*Director of the United States Patent and Trademark Office*